(12) United States Patent
Kemmler

(10) Patent No.: US 11,373,369 B2
(45) Date of Patent: Jun. 28, 2022

(54) SYSTEMS AND METHODS FOR EXTRACTION OF MESH GEOMETRY FROM STRAIGHT SKELETON FOR BEVELED SHAPES

(71) Applicant: MAXON Computer GmbH, Friedrichsdorf (DE)

(72) Inventor: Fritz Kemmler, Friedrichsdorf (DE)

(73) Assignee: MAXON Computer GmbH, Friedrichsdorf (DE)

( * ) Notice: Subject to any disclaimer, the term of this patent is extended or adjusted under 35 U.S.C. 154(b) by 0 days.

(21) Appl. No.: 17/010,536

(22) Filed: Sep. 2, 2020

(65) Prior Publication Data

US 2022/0068022 A1 Mar. 3, 2022

(51) Int. Cl.
*G06T 17/00* (2006.01)
*G06T 17/20* (2006.01)

(52) U.S. Cl.
CPC .................................. *G06T 17/20* (2013.01)

(58) Field of Classification Search
None
See application file for complete search history.

(56) References Cited

U.S. PATENT DOCUMENTS

| 4,730,186 A | 3/1988 | Koga et al. |
| 4,963,967 A | 10/1990 | Orland et al. |
| 5,040,081 A | 8/1991 | McCutchen |
| 5,086,495 A * | 2/1992 | Gray ........................ G06T 17/20 345/420 |
| 5,519,828 A | 5/1996 | Rayner |
| 5,555,357 A | 9/1996 | Fernandes et al. |
| 5,623,612 A | 4/1997 | Haneda et al. |

(Continued)

FOREIGN PATENT DOCUMENTS

| EP | 0916374 A2 | 5/1999 |
| EP | 2230666 A2 | 9/2010 |

(Continued)

OTHER PUBLICATIONS

Held M, Palfrader P. Skeletal structures for modeling generalized chamfers and fillets in the presence of complex miters. Computer-Aided Design and Applications. Jan. 1, 2019;16(4):620-7.*

(Continued)

*Primary Examiner* — Sultana M Zalalee
(74) *Attorney, Agent, or Firm* — DLA Piper LLP (US)

(57) ABSTRACT

Systems and methods are disclosed for polygonal mesh geometry extraction for a bevel operation in a modeling application. One method comprises receiving an original shape outline and determining a straight skeleton graph of the original shape outline, the straight skeleton graph comprising a plurality of edges. One or more inverse offset outlines of the original shape outline may then be determined based on the straight skeleton graph. The method may further comprise determining one or more polygons based on a union of the straight skeleton graph, the original shape outline, and the one or more inverse offset outlines. The one or more polygons may include one or more graph polygons and one or more sub-polygons. A beveled shape of the original shape outline may be generated based on the one or more polygons.

14 Claims, 18 Drawing Sheets

(56) References Cited

U.S. PATENT DOCUMENTS

| | | | |
|---|---|---|---|
| 5,664,132 A | 9/1997 | Smith | |
| 5,745,113 A | 4/1998 | Jordan et al. | |
| 5,828,360 A | 10/1998 | Anderson et al. | |
| 5,933,153 A * | 8/1999 | Deering | G06T 9/001 345/501 |
| 5,936,671 A | 8/1999 | Van Beek et al. | |
| 5,982,909 A | 11/1999 | Erdem et al. | |
| 5,986,662 A | 11/1999 | Argiro et al. | |
| 6,108,006 A * | 8/2000 | Hoppe | G06T 17/20 345/420 |
| 6,144,378 A | 11/2000 | Lee et al. | |
| 6,259,458 B1 | 7/2001 | Theisen et al. | |
| 6,373,488 B1 | 4/2002 | Gasper et al. | |
| 6,389,173 B1 | 5/2002 | Suzuki et al. | |
| 6,448,987 B1 | 9/2002 | Easty et al. | |
| 6,452,875 B1 | 9/2002 | Lee et al. | |
| 6,546,558 B1 | 4/2003 | Taguchi | |
| 6,549,219 B2 | 4/2003 | Selker | |
| 6,629,065 B1 | 9/2003 | Gadh et al. | |
| 6,728,682 B2 | 4/2004 | Fasciano | |
| 6,771,263 B1 | 8/2004 | Behrens et al. | |
| 6,839,462 B1 | 1/2005 | Kitney et al. | |
| 6,888,916 B2 | 5/2005 | Launay et al. | |
| 6,973,200 B1 | 12/2005 | Tanaka et al. | |
| 6,993,399 B1 | 1/2006 | Covell et al. | |
| 7,290,704 B1 | 11/2007 | Ball et al. | |
| 7,372,472 B1 | 5/2008 | Bordeleau et al. | |
| 7,401,731 B1 | 7/2008 | Pletz et al. | |
| 7,413,113 B1 | 8/2008 | Zhu | |
| 7,423,645 B2 | 9/2008 | Dougherty et al. | |
| 7,439,975 B2 | 10/2008 | Hsu et al. | |
| 7,487,170 B2 | 2/2009 | Stevens | |
| 7,512,886 B1 | 5/2009 | Herberger et al. | |
| 7,584,152 B2 | 9/2009 | Gupta et al. | |
| 7,603,623 B1 | 10/2009 | Lengeling et al. | |
| 7,668,243 B2 | 2/2010 | Ho et al. | |
| 7,692,724 B2 | 4/2010 | Arora et al. | |
| 7,701,445 B2 | 4/2010 | Inokawa et al. | |
| 7,730,429 B2 | 6/2010 | Kruse et al. | |
| 7,770,125 B1 | 8/2010 | Young et al. | |
| 7,831,521 B1 | 11/2010 | Ball et al. | |
| 7,949,946 B2 | 5/2011 | Mollicone et al. | |
| 8,103,545 B2 | 1/2012 | Ramer et al. | |
| 8,140,389 B2 | 3/2012 | Altberg et al. | |
| 8,161,396 B2 | 4/2012 | Barber et al. | |
| 8,205,148 B1 | 6/2012 | Sharpe et al. | |
| 8,336,770 B2 | 12/2012 | Grillion | |
| 8,345,046 B2 | 1/2013 | Norrby | |
| 8,375,329 B2 | 2/2013 | Drayton et al. | |
| 8,413,040 B2 | 4/2013 | O'Dell-Alexander | |
| 8,519,979 B1 | 8/2013 | Smith et al. | |
| 8,560,449 B1 | 10/2013 | Sears | |
| 8,601,366 B2 | 12/2013 | Saltwell et al. | |
| 8,667,406 B1 | 3/2014 | Thakur et al. | |
| 8,698,806 B2 | 4/2014 | Kunert et al. | |
| 8,793,599 B1 | 7/2014 | Lajoie et al. | |
| 8,850,335 B2 | 9/2014 | Eldridge et al. | |
| 9,035,949 B1 | 5/2015 | Oberheu et al. | |
| 9,038,001 B2 | 5/2015 | Jetter et al. | |
| 9,158,508 B2 | 10/2015 | Eldridge et al. | |
| 9,223,488 B1 | 12/2015 | Lajoie | |
| 9,449,647 B2 | 9/2016 | Sharpe et al. | |
| 9,478,033 B1 | 10/2016 | Sharpe et al. | |
| 9,734,608 B2 | 8/2017 | Grealish et al. | |
| 9,766,787 B2 | 9/2017 | Danton et al. | |
| 9,804,747 B2 | 10/2017 | Schmitlin et al. | |
| 10,434,717 B2 | 10/2019 | Boettcher et al. | |
| 2002/0094135 A1 | 7/2002 | Caspi et al. | |
| 2002/0122113 A1 | 9/2002 | Foote | |
| 2002/0123938 A1 | 9/2002 | Yu et al. | |
| 2003/0146915 A1 | 8/2003 | Brook et al. | |
| 2003/0160944 A1 | 8/2003 | Foote et al. | |
| 2003/0179234 A1 | 9/2003 | Nelson et al. | |
| 2003/0179740 A1 | 9/2003 | Baina et al. | |
| 2004/0049739 A1 | 3/2004 | McArdle et al. | |
| 2004/0148159 A1 | 7/2004 | Crockett et al. | |
| 2004/0170392 A1 | 9/2004 | Lu et al. | |
| 2005/0046889 A1 | 3/2005 | Braudaway | |
| 2005/0162395 A1 | 7/2005 | Unruh | |
| 2005/0165840 A1 | 7/2005 | Pratt et al. | |
| 2005/0192956 A1 | 9/2005 | Evans | |
| 2005/0199714 A1 | 9/2005 | Brandt et al. | |
| 2006/0008247 A1 | 1/2006 | Minami et al. | |
| 2006/0078305 A1 | 4/2006 | Arora et al. | |
| 2006/0098007 A1 * | 5/2006 | Rouet | G06T 7/149 345/419 |
| 2006/0121436 A1 | 6/2006 | Kruse et al. | |
| 2006/0123445 A1 | 6/2006 | Sullivan et al. | |
| 2006/0150072 A1 | 7/2006 | Salvucci | |
| 2006/0212704 A1 | 9/2006 | Kirovski et al. | |
| 2006/0290695 A1 * | 12/2006 | Salomie | G06T 17/20 345/420 |
| 2007/0002047 A1 | 1/2007 | Desgranges et al. | |
| 2007/0036403 A1 | 2/2007 | Albertson et al. | |
| 2007/0075998 A1 | 4/2007 | Cook et al. | |
| 2007/0100773 A1 | 5/2007 | Wallach | |
| 2007/0162844 A1 | 7/2007 | Woodall et al. | |
| 2007/0189708 A1 | 8/2007 | Lerman et al. | |
| 2007/0230765 A1 | 10/2007 | Wang et al. | |
| 2007/0248321 A1 | 10/2007 | Hamada et al. | |
| 2007/0248322 A1 | 10/2007 | Hamada et al. | |
| 2007/0256029 A1 | 11/2007 | Maxwell | |
| 2007/0257909 A1 * | 11/2007 | Kihslinger | G06T 17/20 345/420 |
| 2008/0005130 A1 | 1/2008 | Logan et al. | |
| 2008/0012859 A1 | 1/2008 | Saillet et al. | |
| 2008/0021787 A1 | 1/2008 | Mackouse | |
| 2008/0033880 A1 | 2/2008 | Fiebiger et al. | |
| 2008/0079851 A1 | 4/2008 | Stanger et al. | |
| 2008/0082510 A1 | 4/2008 | Wang et al. | |
| 2008/0099552 A1 | 5/2008 | Grillion | |
| 2008/0117204 A1 | 5/2008 | Thom | |
| 2008/0150937 A1 | 6/2008 | Lundstrom et al. | |
| 2008/0162577 A1 | 7/2008 | Fukuda et al. | |
| 2008/0177663 A1 | 7/2008 | Gupta et al. | |
| 2008/0256448 A1 | 10/2008 | Bhatt | |
| 2008/0301341 A1 | 12/2008 | Mosek et al. | |
| 2008/0304814 A1 | 12/2008 | Fujii et al. | |
| 2008/0306790 A1 | 12/2008 | Otto et al. | |
| 2008/0313565 A1 | 12/2008 | Albertson | |
| 2009/0034940 A1 | 2/2009 | Hamada et al. | |
| 2009/0063312 A1 | 3/2009 | Hurst | |
| 2009/0079742 A1 | 3/2009 | Albertson et al. | |
| 2009/0087161 A1 | 4/2009 | Roberts et al. | |
| 2009/0157519 A1 | 6/2009 | Bishop et al. | |
| 2009/0167942 A1 | 7/2009 | Hoogenstraaten et al. | |
| 2009/0171683 A1 | 7/2009 | Hoyos et al. | |
| 2009/0192904 A1 | 7/2009 | Patterson et al. | |
| 2009/0198614 A1 | 8/2009 | De Ruiter et al. | |
| 2009/0199123 A1 | 8/2009 | Albertson et al. | |
| 2009/0228786 A1 | 9/2009 | Danton et al. | |
| 2009/0231337 A1 * | 9/2009 | Carr | G06T 17/10 345/423 |
| 2009/0254864 A1 | 10/2009 | Whittington et al. | |
| 2009/0279453 A1 * | 11/2009 | Yeh | G06T 11/203 370/254 |
| 2009/0318800 A1 | 12/2009 | Gundel et al. | |
| 2009/0319948 A1 | 12/2009 | Stannard et al. | |
| 2010/0050083 A1 | 2/2010 | Axen et al. | |
| 2010/0053215 A1 | 3/2010 | Coldicott et al. | |
| 2010/0058161 A1 | 3/2010 | Coldicott et al. | |
| 2010/0058162 A1 | 3/2010 | Coldicott et al. | |
| 2010/0063903 A1 | 3/2010 | Whipple et al. | |
| 2010/0083077 A1 | 4/2010 | Paulsen et al. | |
| 2010/0146393 A1 | 6/2010 | Land et al. | |
| 2010/0153841 A1 | 6/2010 | Haug, III et al. | |
| 2010/0183280 A1 | 7/2010 | Beauregard et al. | |
| 2010/0185985 A1 | 7/2010 | Chmielewski et al. | |
| 2010/0192101 A1 | 7/2010 | Chmielewski et al. | |
| 2010/0192102 A1 | 7/2010 | Chmielewski et al. | |
| 2010/0211860 A1 | 8/2010 | O'Dell-Alexander | |
| 2010/0228669 A1 | 9/2010 | Karim | |
| 2010/0333030 A1 | 12/2010 | Johns | |
| 2012/0081389 A1 | 4/2012 | Dilts | |

(56) References Cited

U.S. PATENT DOCUMENTS

| | | |
|---|---|---|
| 2012/0290609 A1 | 11/2012 | Britt |
| 2012/0293558 A1 | 11/2012 | Dilts |
| 2013/0073500 A1 | 3/2013 | Szatmary et al. |
| 2013/0093787 A1 | 4/2013 | Fulks et al. |
| 2013/0151413 A1 | 6/2013 | Sears |
| 2013/0328870 A1* | 12/2013 | Grenfell ............... G06T 15/04 345/420 |
| 2014/0132603 A1* | 5/2014 | Raghoebardayal ..... G06T 15/04 345/420 |
| 2015/0134095 A1* | 5/2015 | Hemani ............... B29C 64/386 700/98 |
| 2015/0149314 A1 | 5/2015 | Sears |
| 2015/0161595 A1 | 6/2015 | Sears |
| 2015/0279071 A1 | 10/2015 | Xin |
| 2015/0331968 A1 | 11/2015 | Crocker |
| 2016/0216872 A1 | 7/2016 | Dilts |
| 2018/0108164 A1 | 4/2018 | Dilts |
| 2019/0258693 A1 | 8/2019 | Lawrence |
| 2020/0137195 A1 | 4/2020 | Lipke et al. |
| 2021/0065424 A1 | 3/2021 | Kniemeyer |
| 2021/0271784 A1 | 9/2021 | Marl et al. |
| 2022/0068036 A1 | 3/2022 | Ng et al. |

FOREIGN PATENT DOCUMENTS

| | | |
|---|---|---|
| JP | 2008305241 A | 12/2008 |
| WO | WO0139130 A1 | 5/2001 |
| WO | WO2004040576 A1 | 5/2004 |
| WO | WO2009042858 A1 | 4/2009 |
| WO | WO2010034063 A1 | 4/2010 |
| WO | WO2010068175 A2 | 6/2010 |
| WO | WO2010138776 A2 | 12/2010 |
| WO | WO2016179401 A1 | 11/2016 |

OTHER PUBLICATIONS

Palfrader, P., Weighted Skeletal Structures in Theory and Practice (Doctoral dissertation, University of Salzburg).*
Shrstha et al., "Synchronization of Multi-Camera Video Recordings Based on Audio", MM '07: Proceedings of the 15th ACM international conference on Multimedia, Sep. 2007, Augsburg, Bavaria, Germany, pp. 545-548, 5 pages. https://doi.org/10.1145/1291233.1291367.
Haitsma, J. et al., "A Highly Robust Audio Fingerprinting System", IRCAM, 2002, 9 pages.
Toklu et al., "Semi-automatic video object segmentation in the presence of occlusion", Jun. 2000, IEEE Transactions on Circuits and Systems for Video Technology, vol. 10, iss. 624-629, 3 pages.
Toklu et al., "Two-dimensional triangular mesh-based mosaicking for object tracking in the presence of occlusion", Jan. 10, 1997, Proc. SPIE, Visual Communications and Image Processing '97, vol. 3024, p. 328-337, 11 pages.
Toklu et al., "Tracking Motion and Intensity Variations Using Hierarchical 2-D Mesh Modeling for Synthetic Object Transfiguration", Nov. 1996, Graphical Models and Image Processing, vol. 58, No. 6, p. 553-573, 21 p.
Jain et al., "Non-Rigid Spectral Correspondence of Triangle Meshes", Apr. 5, 2007, International Journal of Shape Modeling, 25 pages.
Toklu et al., "2-D mesh-based tracking of deformable objects with occlusion", Sep. 19, 1996, Proceedings of International Conference on Image Processing, 1996, vol. 1, p. 933-936, 3 pages.
Zhao et al., "An object tracking algorithm based on occlusion mesh model", 2002, Proceedings of International Conference on Machine Learning and Cybernetics, 2002, vol. 1, p. 288-292, 3 pages.
Altunbasak et al., "Occlusion-adaptive 2-D mesh tracking", May 10, 1996, Conference Proceedings ICASSP-96, vol. 4, p. 2108-2111.
Tekalp et al., "Face and 2-D mesh animation in MPEG-4", Jan. 2000, Signal Processing: Image Communication, vol. 15, issue 4-5, p. 387-421. https://doi.org/10.1016/S0923-5965 (99)00055-7.
Shewchuk, "Triangle: Engineering a 2D quality mesh generator and Delaunay triangulator", 1996, Applied Computational Geometry towards Geometric Engineering Lecture Notes in Computer Science, 1996, vol. 1148, 11 pages.
Dobashi et al., Interactive Rendering method for Displaying Shafts of Light, Proceedings Computer Graphics and Applications; Oct. 2000, pp. 31-37, 435, 3 pages. DOI:10.1109/PCCGA.2000.883864.
Li et al., Unified Volumes for Light Shaft and Shadow with Scattering, 2007 10th IEEE International Conference on Computer-Aided Design and Computer Graphics, Oct. 2007, pp. 161-166.
Akenine-Moller, T., et al., Real-Time Rendering, (Second Edition, A. K. Peters, Ltd., Wellesley, MA), (202), pp. 158, 315-316.
Herndon, K. P., et al., "Interactive Shadows", UIST: Proceedings of the Fifth Annual ACM Symposium on User Interface Software and Technology, (Nov. 15-18, 1992), (1992), 1-6.
Loscos, C., et al., "Real-Time Shadows for Animated Crowds in Virtual Cities", VRST 2001. Proceedings of the ACM Symposium on Virtual Reality Software and Technology, (Nov. 15-17, 2001, Banff, Alberta, Canada), (2001), 85-92.
Woo, A., et al., "A Survey of Shadow Algorithms", IEEE Computer Graphics & Applications, (Nov. 1990), 31 pages.
Bregler, Christoph et al., "Video Rewrite: Driving Visual Speech with Audio", ACM Siggraph 97, Proceedings of the 24th Annual Conference on Computer Graphics and Interactive Techniques, 1997, ISBN: 0-89791-896-7, pp. 1-8.
"Alaric: Euronet Worldwide to implement Alarics Fractals fraud detection solution; Fractals will provide a comprehensive fraud solution for the prevention and detection of fraudulent transactions", M2 Presswire [Coventry], Nov. 7, 2006, pp. 1-2.
Martin Held et al., 'Straight Skeletons and Mitered Offsets of Polyhedral Terrains in 3D', Computer-Aided Design and Applications, vol. 16, No. 4, 2019, pp. 611-619, Jul. 9, 2018, pp. 611-617.
Gill Barequet et al., 'Straight Skeletons of Three-Dimensional Polyhedra', arXiv:0805.0022v1, Apr. 30, 2008, pp. 1-11.

* cited by examiner

SYSTEMS AND METHODS FOR EXTRACTION OF MESH GEOMETRY FROM STRAIGHT SKELETON FOR BEVELED SHAPES

TECHNICAL FIELD

The present disclosure relates to systems and methods to create a mesh geometry for three dimensional beveled shapes. More particularly, the present disclosure relates to systems and methods for creating a polygonal mesh geometry, based on a straight skeleton graph of an outline shape of an object.

BACKGROUND

One of the common techniques to define three dimensional (3D) objects in a 3D modeling application is to extrude two dimensional (2D) outlines. The technique is often performed to create 3D text or to give depth to various graphical elements. Specifically, a shape is sampled by an arbitrary algorithm to discretize it. This creates a set of points each connected to the next point with a linear line segment. These line segments each build one quadrangle in the extrusion of which they represent one of the four edges. The other three edges are created by connecting each line's start and end points with a clone of the discretized shape in the extrusion direction and the corresponding cloned line segment. The created geometry can be defined in distinct parts: the surfaces created on the inside of the outlines, called "caps"; and the surfaces that build the extrusion of the outlines, called "hulls".

To improve the aesthetic of the created 3D shape and to emulate real world shapes, the border edge between the caps and the hulls can be beveled, also referred to as chamfered. When combined with state of the art image synthesis techniques, these beveled edges reflect light to a virtual camera, which greatly improves visual fidelity, as real world objects rarely have perfect edges and thus also reflect real world light in a similar way.

To create the necessary mesh geometry for the parts that make up the beveled shape is very similar to how the extruded geometry was created. This bevel operation can, for example, be performed by the following operations: clone the outline; shrink the outline locally in a direction that points to the inside of the original outline as far as the bevel size requires it to (this process is called an inverse offset, and the outline formed as a result of the inverse offset is called an inverse offset outline); and connect the original outline line segments with the shrunk island (i.e., the inverse offset outline) as described for extrusion. These operations can be applied multiple times to create additional rings of geometry in the direction of the inverse offset, for example to allow rounded bevel shapes by placing all of the sub-steps in an arc.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for polygonal mesh geometry extraction for a bevel operation in a modeling application. The method comprises: receiving an original shape outline; determining a straight skeleton graph of the original shape outline, the straight skeleton graph comprising a plurality of edges; determining one or more inverse offset outlines of the original shape outline based on the straight skeleton graph; determining one or more polygons based on a union of the straight skeleton graph, the original shape outline, and the one or more inverse offset outlines, the one or more polygons including one or more graph polygons and one or more sub-polygons; and generating a beveled shape of the original shape outline based on the one or more polygons.

Another embodiment provides a system for polygonal mesh geometry extraction for a bevel operation in a modeling application. The system comprises one or more processors and at least one non-transitory computer readable medium storing instructions which, when executed by the one or more processors, cause the one or more processors to perform operations comprising: receiving an original shape outline; determining a straight skeleton graph of the original shape outline, the straight skeleton graph comprising a plurality of edges; determining one or more inverse offset outlines of the original shape outline based on the straight skeleton graph; determining one or more polygons based on a union of the straight skeleton graph, the original shape outline, and the one or more inverse offset outlines, the one or more polygons including one or more graph polygons and one or more sub-polygons; and generating a beveled shape of the original shape outline based on the one or more polygons.

Another embodiment provides at least one non-transitory computer readable medium for polygonal mesh geometry extraction for a bevel operation in a modeling application. The at least one non-transitory computer readable medium stores instructions which, when executed by one or more processors, cause the one or more processors to perform operations comprising: receiving an original shape outline; determining a straight skeleton graph of the original shape outline, the straight skeleton graph comprising a plurality of edges; determining one or more inverse offset outlines of the original shape outline based on the straight skeleton graph; determining one or more polygons based on a union of the straight skeleton graph, the original shape outline, and the one or more inverse offset outlines, the one or more polygons including one or more graph polygons and one or more sub-polygons; and generating a beveled shape of the original shape outline based on the one or more polygons.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
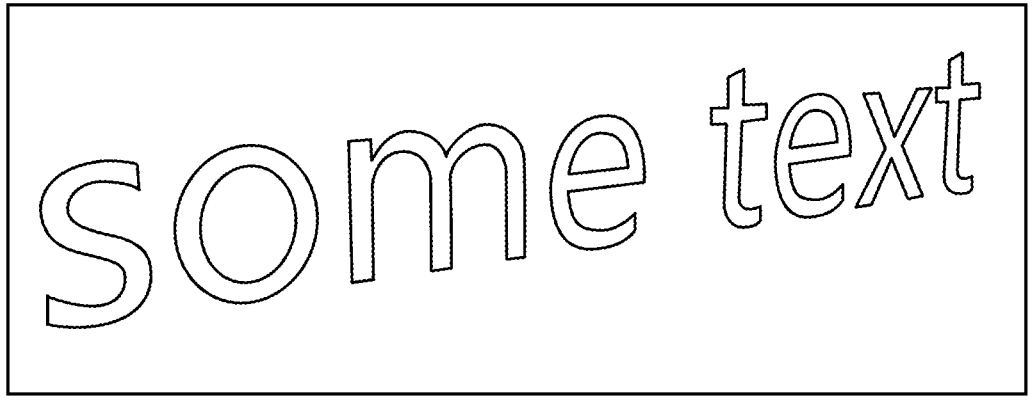
FIG. 1A shows a 2D outline of example text.

The following embodiments describe systems and methods for creating a mesh geometry for 3D beveled shapes, and, more particularly, for creating a closed polygonal mesh without overlapping artifacts.

In a 3D modeling application, the inverse offset operation during the generation of bevel geometry can become a complicated problem in convex areas, as the outline points are moved individually from each other. This can move them closer to each other with increasing offset distance to the point of flipping orientation of the line segments connecting them, as shown in FIGS. 3A-3E for example. This is just one example of multiple events that can happen when applying an inverse offset to an outline by trivially moving points. Each of these cases create different kinds of artifacts that all reduce the usability of this trivial algorithm for the use-case of beveled edges for many shapes.

One example algorithm that may solve the above-described problem calculates the "straight skeleton" of the outline, called a straight skeleton graph. The straight skeleton graph contains the path of each outline point with increasing offset distance to its original position. The straight skeleton detects and resolves all events that would create previously mentioned problems to provide a data structure from which an overlap free inverse offset at any offset distance could be extracted.

The technique using the straight skeleton graph can be applied to creating the inverse offset of an outline in areas where the inverse offset of an outline is the final output of the operation. Such application might pose another problem, as the conventional approaches to mesh geometry generation for beveled shapes require the original outline and the inverse offset outline to have the same amount of points and line segments, making it easy to connect the outline segments with the inverse offset outline segments to create the final geometry. With the technique using the straight skeleton graph, the inverse offset outline will have a different amount of points and/or as the matching cannot be performed as easily as soon as at least one event that would create an overlap otherwise has been processed by the straight skeleton. These overlapping events are all internal crossings of the straight skeleton graph with three of more lines connected to them. A new approach is needed to extract offset geometry that can be applied to a straight skeleton graph.

The benefits of the techniques proposed in the current disclosure include: (1) an approach to create a mesh geometry used for 3D beveled shapes that have been created out of a 2D shape without overlapping artifacts (e.g., FIGS. 3A-3E), regardless of how large the bevel offset size is; and (2) efficient creation of geometry that allows interactive editing and shaping of a bevel with controllable subdivisions orthogonal to the shaping plane.

The goal of the proposed techniques is to create a closed polygonal mesh consisting mainly of quadrangles and triangles whose edges are the union of the straight skeleton of the outline and multiple inverse offset outlines with arbitrarily defined offsets, starting from an outline described by clockwise-ordered 2D points and the internal straight skeleton graph of that outline. The resultant polygonal mesh should have the following structure: polygons are defined by a list of indices, which in turn reference a list of 2D positions. Each point of the output mesh may be individual and polygons using this position may all reference the same point. Such arrangement guarantees a connected polygonal mesh.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

Figure 1B:
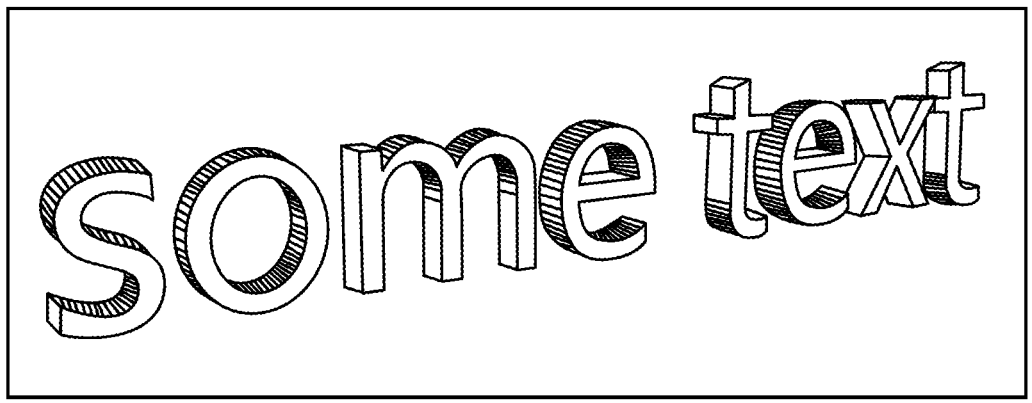
FIG. 1B shows an extruded outline with caps of example text.

Referring now to the appended drawings, FIG. 1A shows a 2D outline of example text, for the purposes of illustration referred to as the original text. FIG. 1B shows the effect of extruding the outline on the original text and adding caps to the extruded text. As explained above, "caps" are surfaces created on the inside of the outline.

Figure 2A:
FIG. 2A shows an extruded outline of example text without beveled edges.
Figure 2B:
FIG. 2B shows an extruded outline of example text with beveled edges.

FIGS. 2A and 2B contrast the aesthetic appearance of 3D texts created as a result of the extrusion illustrated in FIGS. 1A-1B. Specifically, FIG. 2A shows 3D text without beveled edges, while FIG. 2B shows the same 3D text with beveled edges.

Figure 3A:
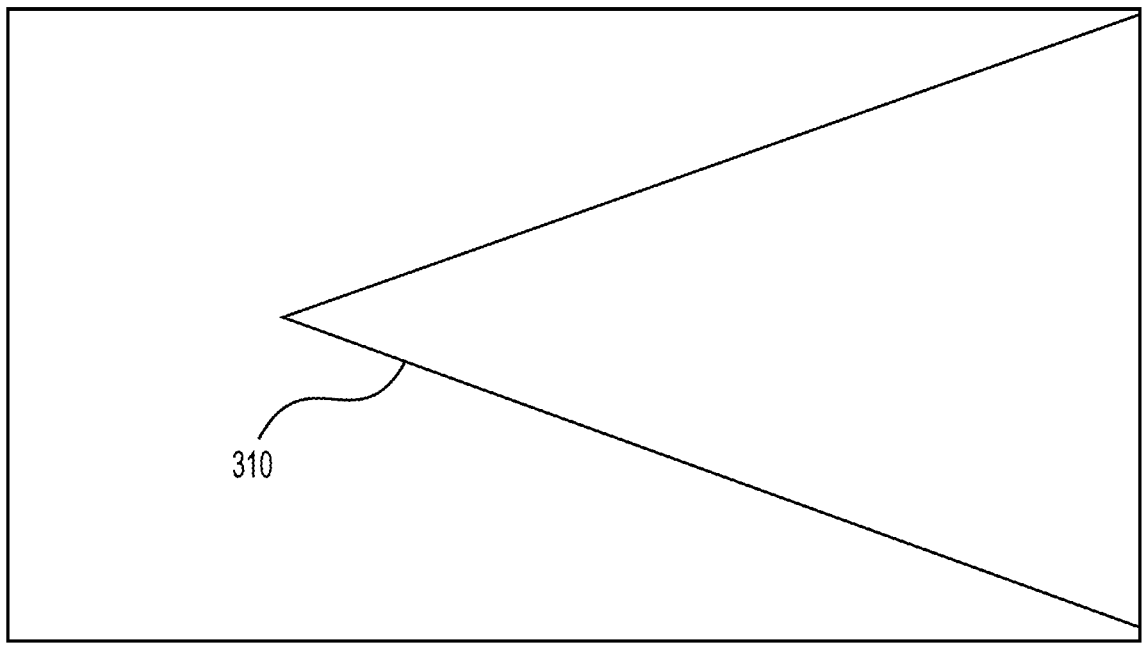
FIG. 3A shows an example outline of an object.
Figure 3B:
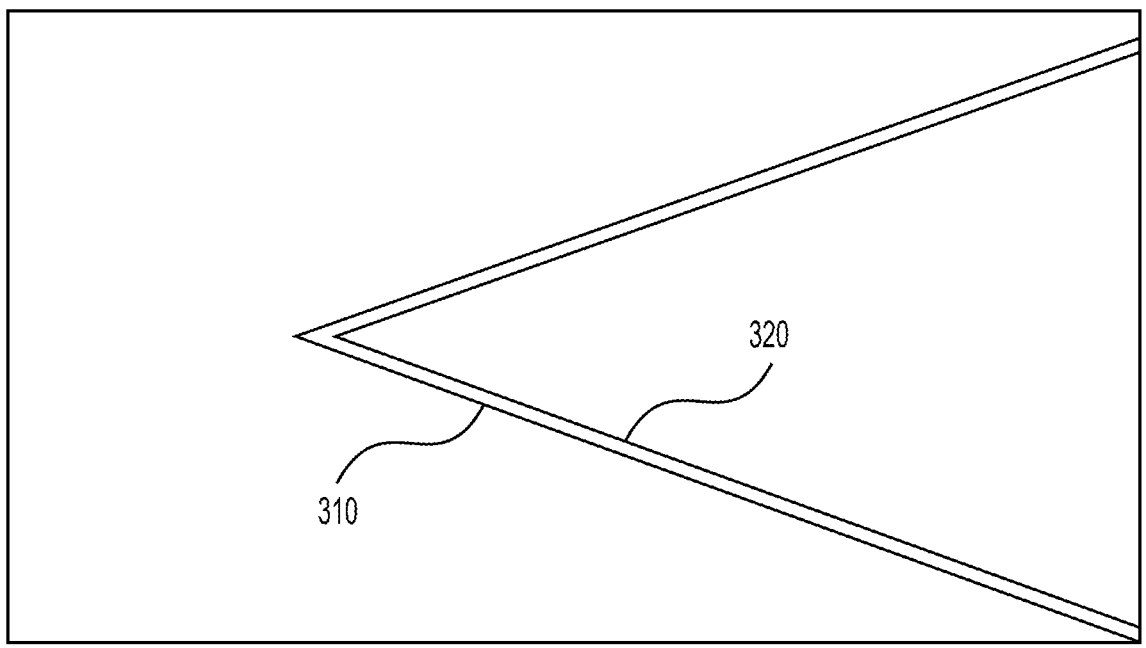
FIG. 3B illustrates creation of an inverse offset from the example outline of FIG. 3A.
Figure 3C:
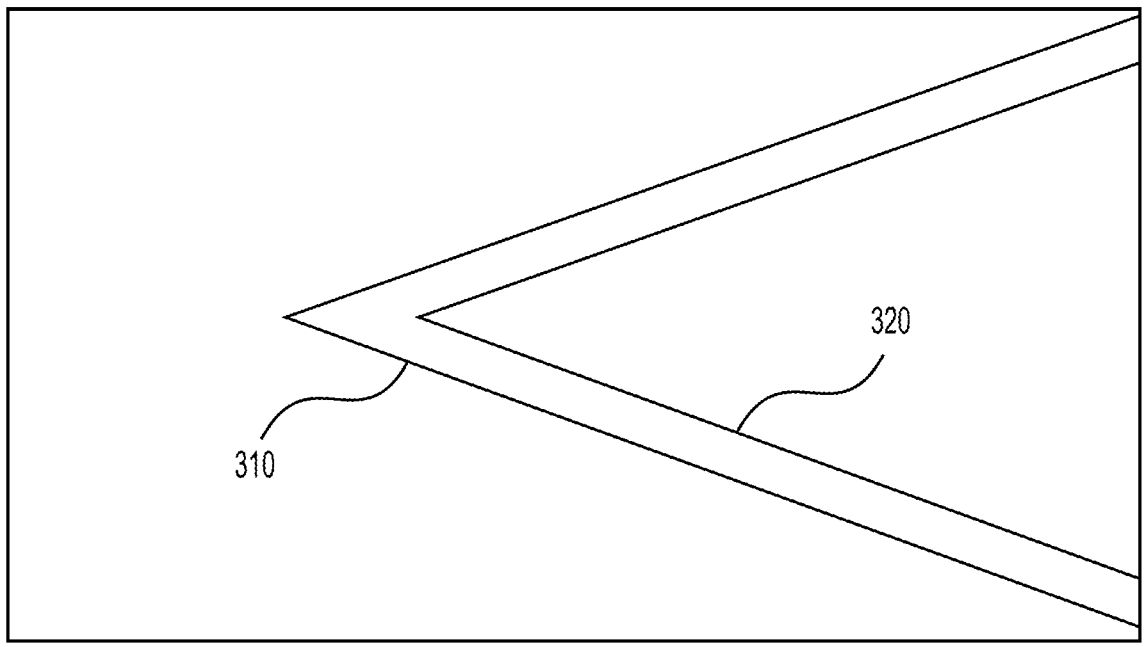
FIG. 3C illustrates creation of an inverse offset where outline points are moved away from one another.
Figure 3D:
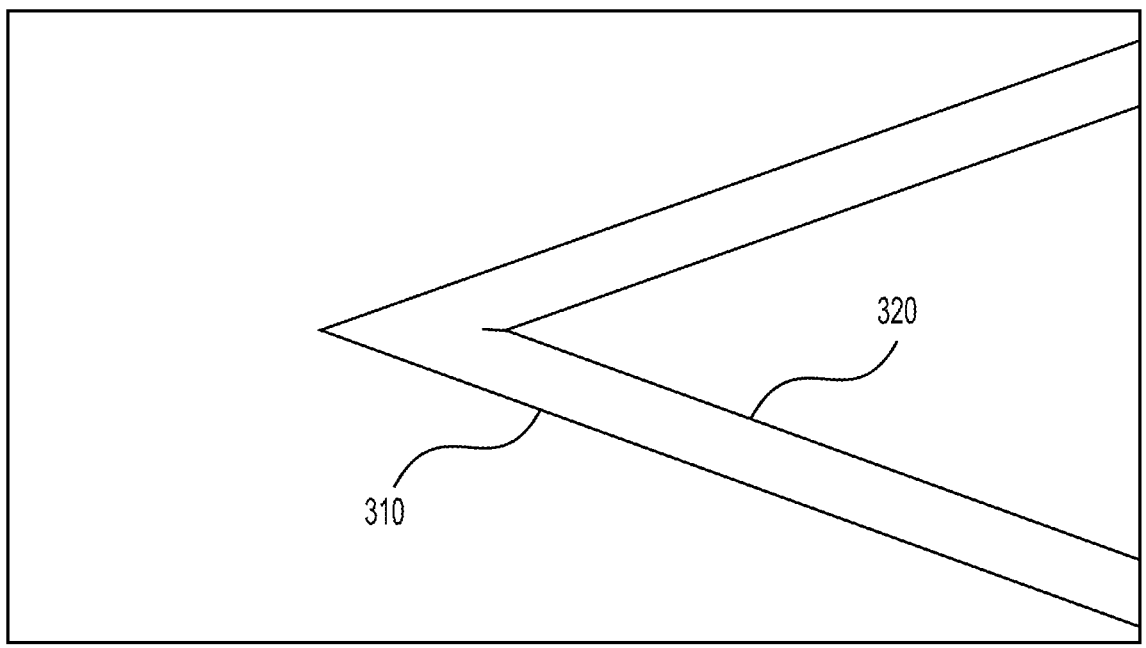
FIG. 3D illustrates creation of an inverse offset where moving the outline points away from one another has flipped the orientation of the line segments connecting them.
Figure 3E:
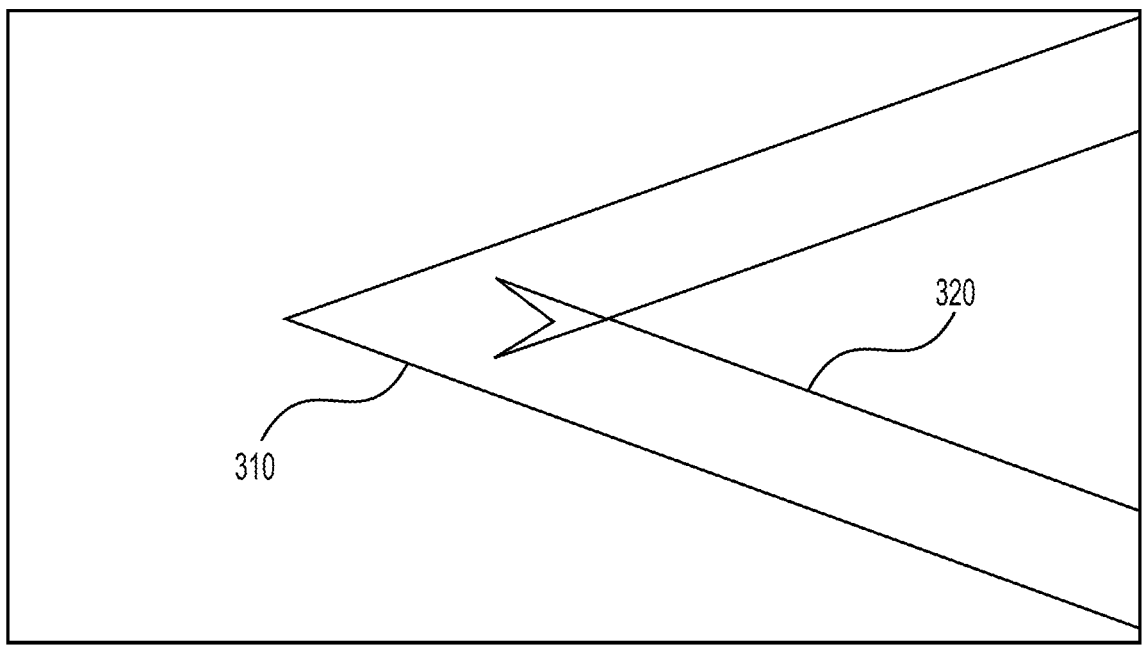
FIG. 3E shows the result of flipping the orientation of the line segments in the inverse offset.

FIGS. 3A-3E illustrate steps performed by an example algorithm configured to create an inverse offset of an original shape outline (also referred to as an outline). In FIG. 3A, an outline 310 is shown in 2D object. The outline 310 has a line 320 of outline points (i.e., an inverse offset outline 320) as the inverse offset is created, as shown in FIG. 3B. In FIG. 3C, the line 320 of outline points are moved further from the outline 310. FIG. 3D continues the movement of the line 320 further from the outline 310, creating an issue when the outline points creating line 320 start to overlap with one another. As the outline points of line 320 continue to move away from the line 310, the line 320 will start to have a flipped orientation and self-crossings in some parts, as illustrated by FIG. 3E. Such an "overlap" event is one of multiple events that can happen when applying an inverse offset to an outline by trivially moving points.

Figure 4A:
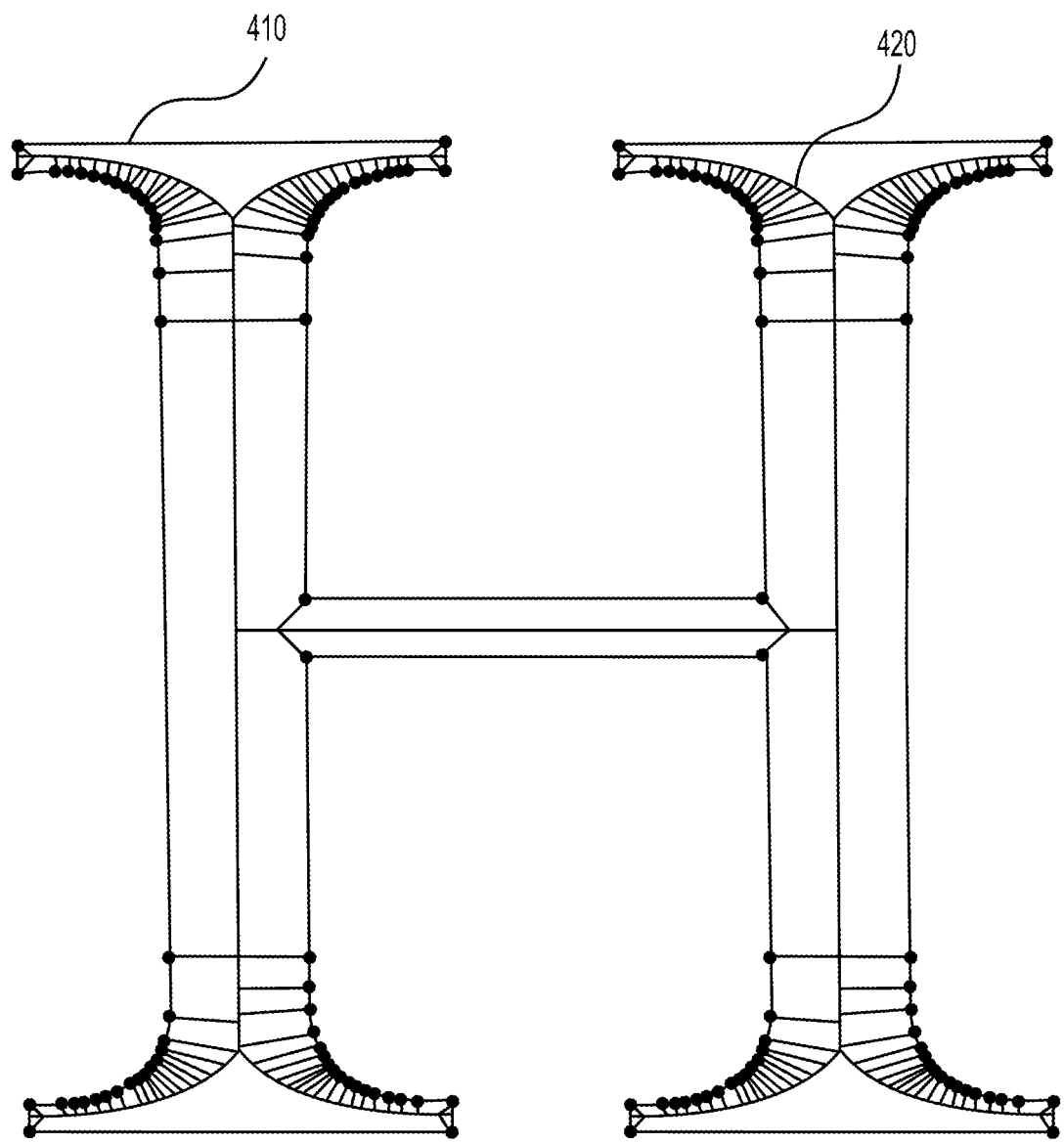
FIG. 4A shows another example outline of an object and a straight skeleton graph of the example outline.
Figure 4B:
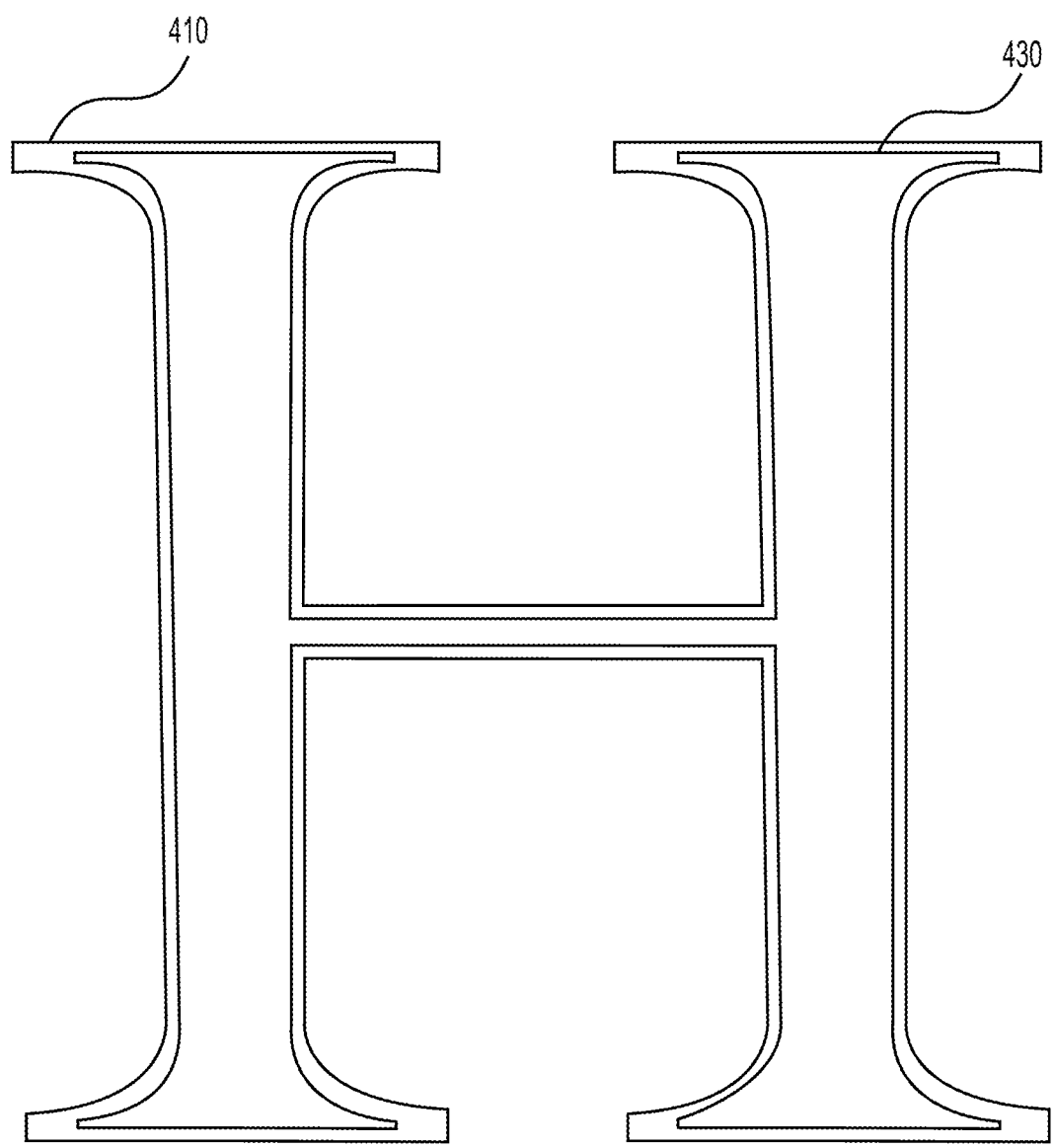
FIG. 4B shows an inverse offset outline extracted from the straight skeleton graph of FIG. 4A.

FIGS. 4A and 4B illustrate creation of another inverse offset outline, for example of a serif letter H. In FIG. 4A, the serif letter H has an outline 410, made of highlighted outline node along the corners of the outline 410. A straight skeleton graph can be generated based on the outline 410, as represented by graph 420 in FIG. 4A. The method of producing the straight skeleton graph is detailed below. An inverse offset outline 430 is extracted from the straight skeleton graph 420, and shown in FIG. 4B. As opposed to the exemplary method shown in FIGS. 3A-3E, this method prevents any overlap of the inverse offset outline 430, and thus there is no flipping of the orientation or self-crossing of the line 430 as the inverse offset points are moved further from the straight skeleton graph 420.

Figure 5:
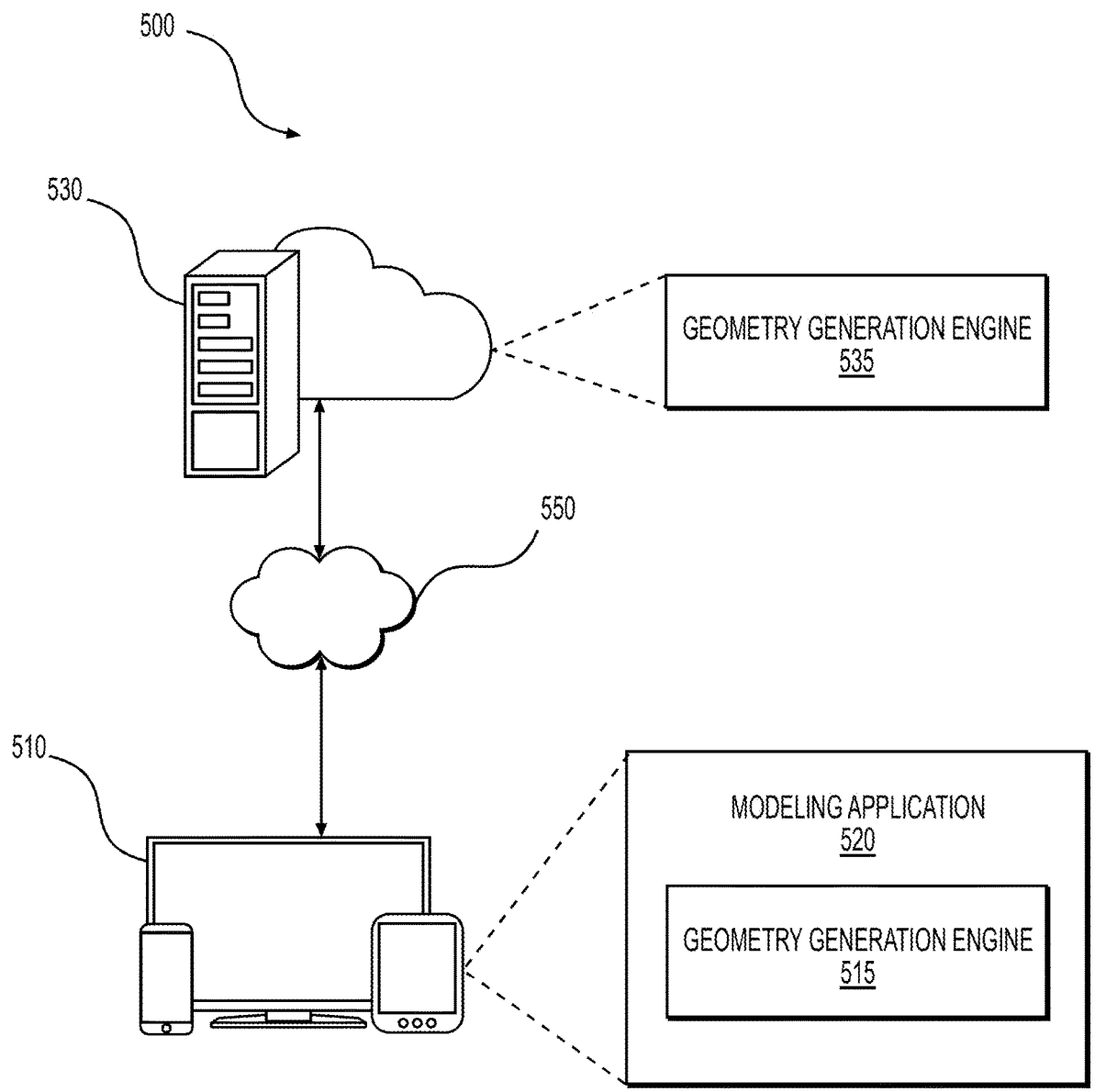
FIG. 5 shows an exemplary system infrastructure of a geometry generation system, according to one aspect of the current disclosure.

FIG. 5 shows an exemplary system infrastructure 500 of the overall environment in which the proposed techniques may be executed. In general, the geometry generation system 500 comprises a network 550, a cloud-based server 530, a geometry generation engine 535, a client device 510, and a modeling application 520 with geometry generation engine 515. The cloud-based server 530 may communicate with other components of the system 500, such as the client device 510, via the network 550. The network 550 may include the Internet, but may also include other networks such as a corporate WAN, cellular network, satellite network, or combination thereof, for example. The network 550 may be employed to enable data communications between the various entities illustrated in FIG. 5.

The proposed mesh geometry generation process may be performed locally at the client device 510 by the modeling application 520 (i.e., by the geometry generation engine 515 that is part of the modeling application 520) and/or by the geometry generation engine 535 residing in the server 530. In the client device 510, the geometry generation engine 515 may function as a part of the modeling application 520. The client device 510 may be a computing device consistent with or similar to the computing device depicted in FIG. 14. It is also possible that the proposed mesh geometry generation process may be executed using the server 530. In such embodiment, the geometry generation engine 535 is stored within the server 530, with which the modeling application 520 on the client device 510 may communicate via the network 550. The server 530 may be a computing device consistent with or similar to the computing device depicted in FIG. 14.

The geometry generation engine 515 may be part of a software application that is installed on the client device 510. For example, the geometry generation engine 515 may be part of a modeling application 520. Likewise, the geometry generation engine 515 may be implemented with any software application 520 in which a need for geometry generation may arise, or may itself be a standalone application in connection with another software application in need of such geometry generation and/or related parameters.

Figure 6:
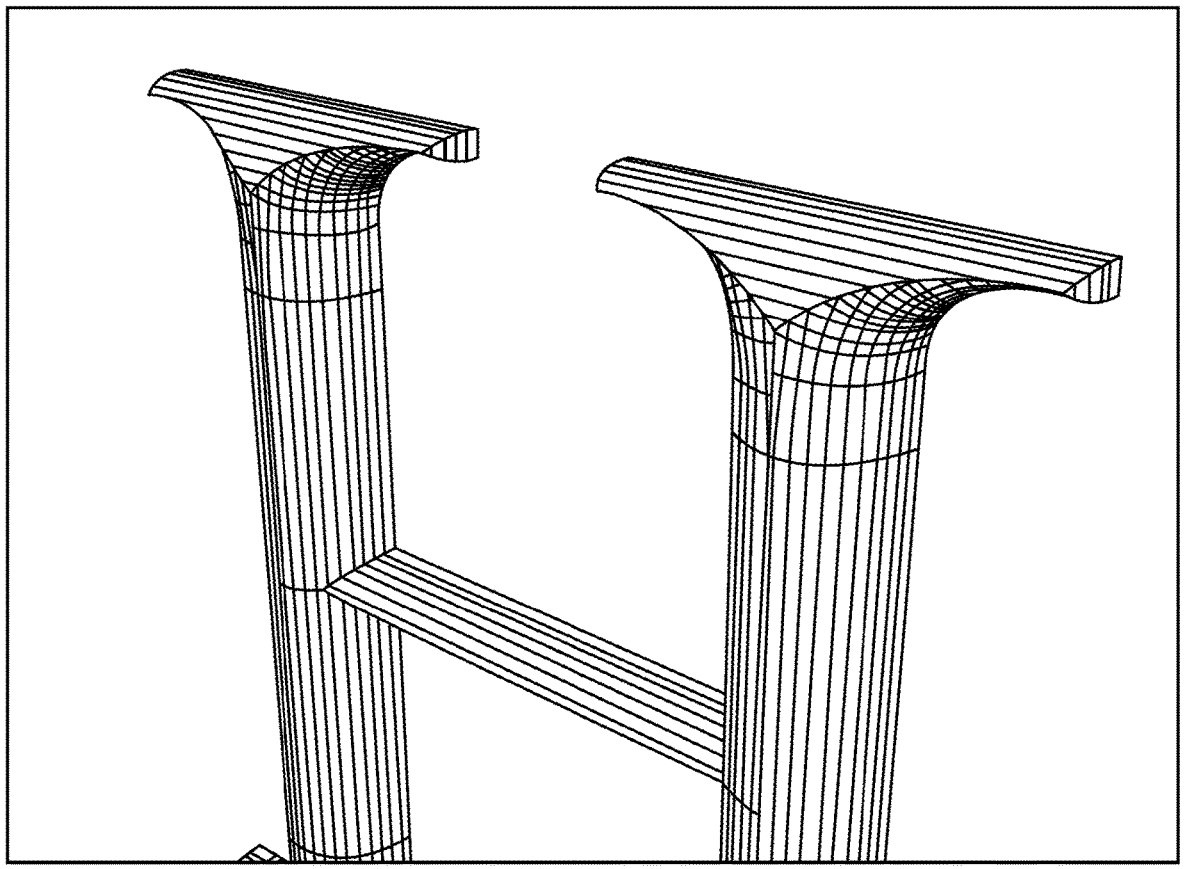
FIG. 6 shows an arc shaped bevel created from the example outline of FIG. 4A, using a disclosed method of extracting mesh geometry.

FIG. 6 shows an arc shaped bevel created from the example outline of FIG. 4A (e.g., a serif letter H), using the method of extracting mesh geometry proposed herein. As seen in FIG. 6, the resulting beveled shape and polygonal mesh are mostly composed of a series of quadrangles and triangles and a few polygons with more than four segments.

Figure 7:
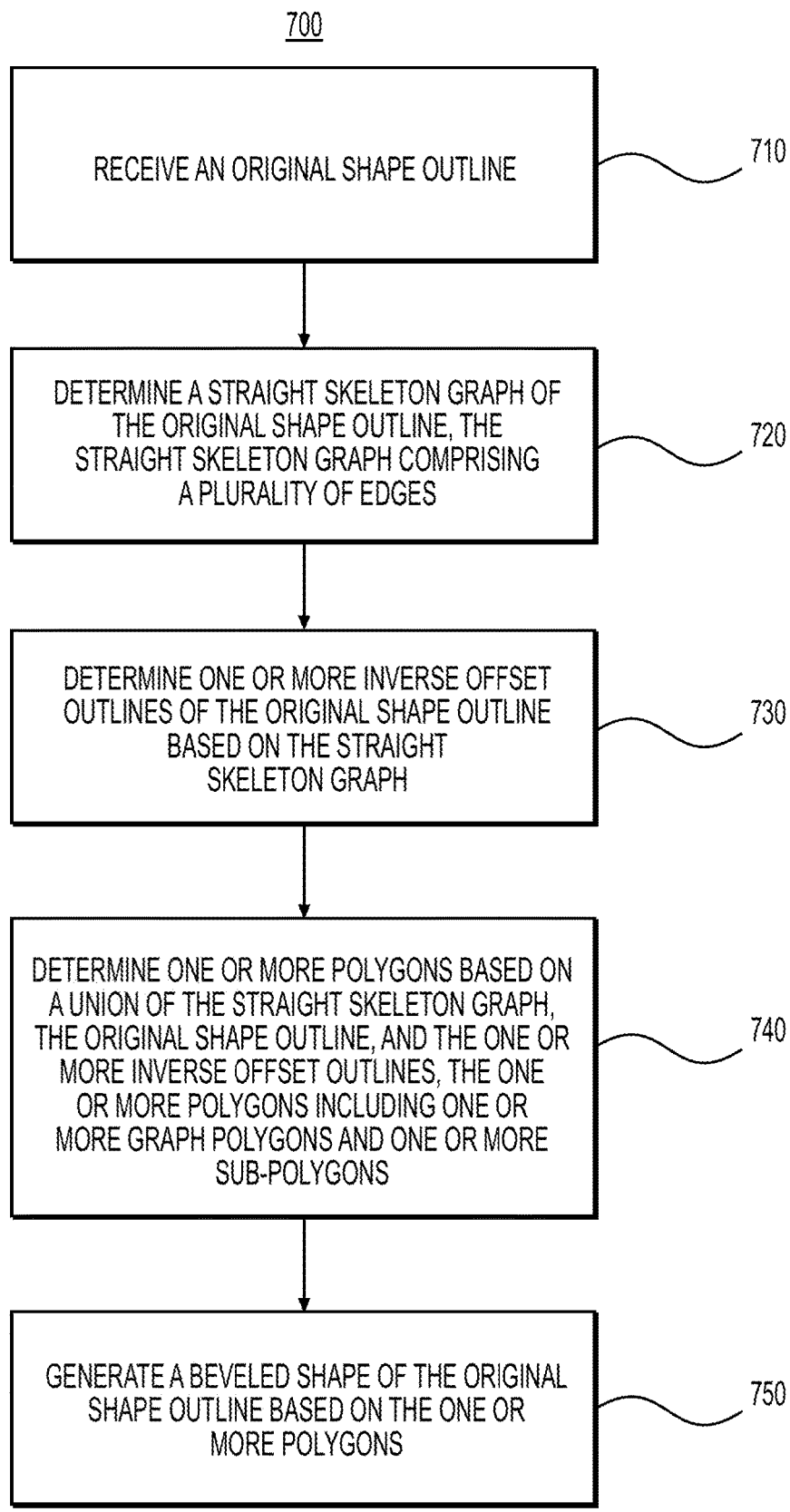
FIG. 7 shows a flowchart illustrating an exemplary method of generating a beveled shape of an original shape outline based on one or more polygons, according to one aspect of the current disclosure.

FIG. 7 is a flowchart illustrating an exemplary method of generating a beveled shape of an original outline. The method 700 may be performed by the geometry generation engine 515 on the client device 510 or the geometry generation engine 535 on the server 530 shown in FIG. 5. At step 710, the geometry generation engine 515 or 535 may receive an original shape outline, such as the original shape outline shown in FIG. 4A. At step 720, the geometry generation engine 515 or 535 may determine a straight skeleton graph of the original shape outline. The straight skeleton graph may comprise a plurality of edges connecting nodes of the straight skeleton graph. At step 730, the geometry generation engine 515 or 535 may determine one or more inverse offset lines of the original shape outline based on the straight skeleton graph.

As shown by step 710, the modeling application 520 may enable a user to select the desired outline and degree of bevel applicable to the received original shape outline. The original shape outline may be an outline of text, as shown in the figures previously described, or may be an outline of an icon, an object, or other graphical element.

As explained above, at step 720, the geometry generation engine 515 or 535 may determine a straight skeleton graph of the original shape outline, wherein the straight skeleton graph comprises a plurality of edges. The straight skeleton graph may be determined using any now known or futuredeveloped technique. For example, a straight skeleton graph must meet a number of requirements: (1) each event in the calculation of the straight skeleton graph should be represented as a node in the graph (also known as a crossing), and each path an outline point took to reach that event should be represented as an edge; (2) for each edge, the start and end nodes must be known; (3) each graph node (i.e., each node on the straight skeleton graph) must be traversable from an incoming edge to the edge next to it in counterclockwise order; (4) each graph node needs to have the offset stored at which the event happened and the 2D position at which it happened; and (5) a graph node that was the start of an outline point needs to be distinguishable.

With continuing conference to FIG. 7, at step 740, the geometry generation engine 515 or 535 may determine one or more polygons based on a union of the straight skeleton graph, the original shape outline, and the one or more inverse offset outlines. The manner in which the polygons may be determined will be discussed in greater detail below in reference to FIG. 9. The one or more polygons may include one or more graph polygons and one or more sub-polygons. At step 750, the geometry generation engine 515 or 535 (or the modeling application 520) may generate a beveled shape of the original shape outline, based on the one or more polygons. An example of a final beveled shape is shown in FIG. 6, which is generated from the corresponding original shape outline shown in FIGS. 4A and 4B.

Figure 8:
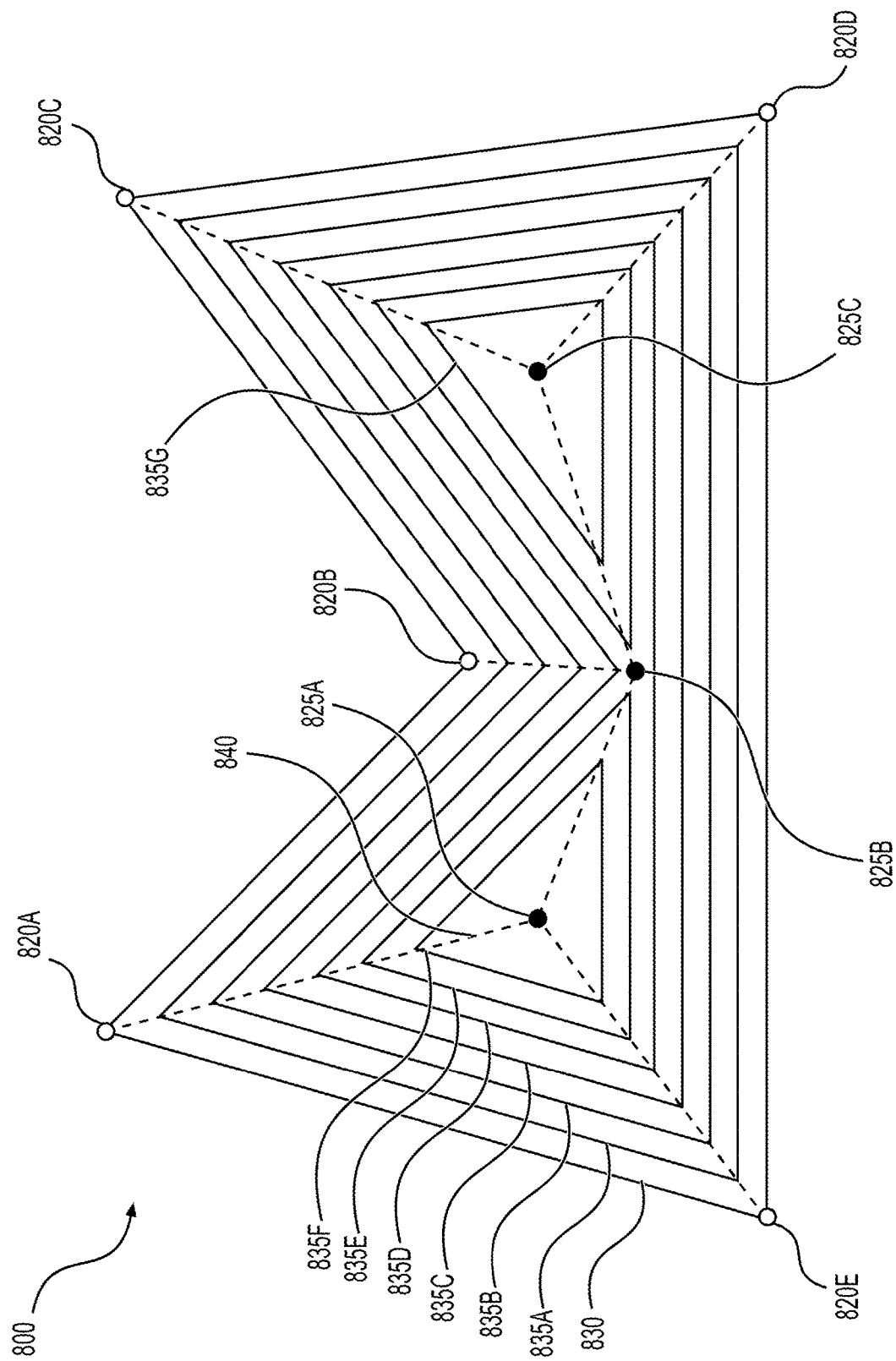
FIG. 8 shows a straight skeleton graph of an original shape outline with inverse offset outlines.

FIG. 8 shows a graph 800 including a straight skeleton graph 840 of an original shape outline 830 with inverse offset outlines 835A-G. Original shape outline 830 includes outline nodes 820A-820E, located at the intersections of the edges of original shape outline 830. As explained above in reference to FIG. 7, the original shape outline 830 may be received in step 710 of method 700. The outline nodes 820A-820E are the points at which the polygon extraction process detailed in method 900 below may start. The graph 800 further comprises the inverse offset outlines 835A-835G, which are offset from the original shape outline 830 by varying degrees. As explained above in reference to FIG. 7, inverse offset outlines 835A-835G may be determined in step 730 of method 700. The inverse offset outlines 835A-835G are all located within the boundaries of the original shape outline 830. Also included in the graph 800 is a straight skeleton graph 840 including graph nodes 825A-825C (i.e., internal nodes 825A-925C), as well as graph nodes 820A-820E which are also referred to herein as outline nodes based on their position along the original shape outline 830. As explained above in reference to FIG. 7, the straight skeleton graph 840 may be determined in step 720 of method 700.

Figure 9:
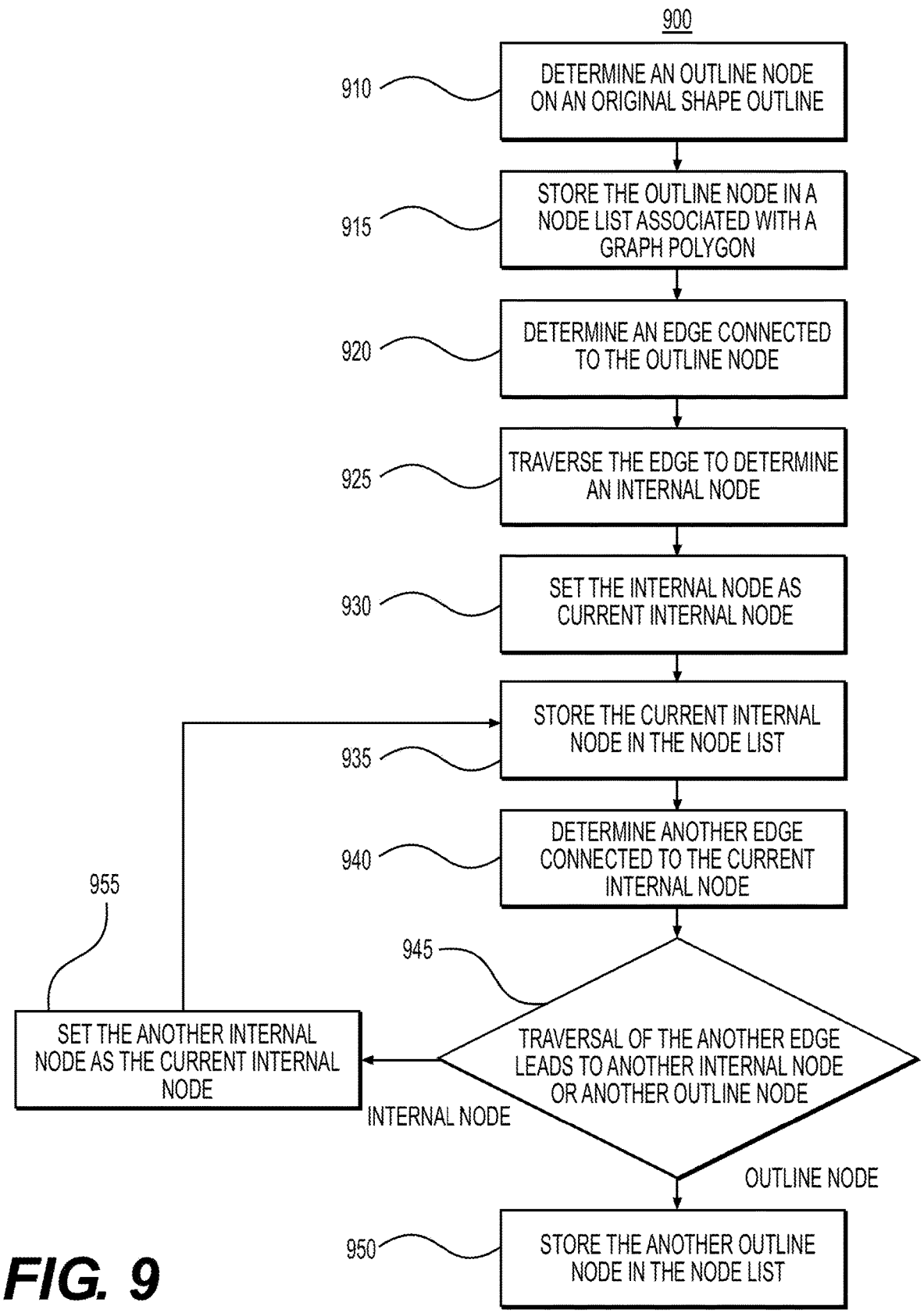
FIG. 9 shows a flowchart illustrating an exemplary method of extracting a graph polygon from a straight skeleton graph, according to one aspect of the current disclosure.

FIG. 9 is a flowchart illustrating an exemplary method of extracting a polygon from a straight skeleton graph, according to one aspect of the current disclosure. The method 900 may be performed by the geometry generation engine 515 on the client device 510 or the geometry generation engine 535 on the server 530 shown in FIG. 5. At step 910, the geometry generation engine 515 or 535 may determine an outline node (e.g., one of outline nodes 820A-820E) on an original shape outline (e.g., original shape outline 830). In a step 915, the geometry generation engine 515 or 535 may store the outline node in a node list associated with a graph polygon. In the current disclosure, storing a node includes storing location information pertinent to the node relative to the graph (e.g., graph 800) or the shape form which the node is derived. For example, the location information comprises one or more of a coordinate of the node, a distance (e.g., an offset) from a particular origin and/or an angle relative to that origin, and any other information that can be used to identify a location of the node.

In step 920, the geometry generation engine 515 or 535 may determine an edge connected to the outline node, and in step 925, may traverse the edge to determine an internal node. In step 930, the geometry generation engine 515 or 535 may set the determined internal node as a current internal node, and in step 935, may store the current internal node in the same node list. In step 940, the geometry generation engine 515 or 535 may determine another edge connected to the current internal node. In one embodiment, the another edge is in a counterclockwise order from the edge traversed to reach the internal node. In step 945, the geometry generation engine 515 or 535 may determine whether traversal of the another edge determined in step 940 leads to another internal node or another outline node. If the traversed edge leads to another internal node, the geometry generation engine 515 or 535 may set the another internal node as the current internal node in step 955, and then the method 900 returns to step 935 for another iteration. On the other hand, if the traversed edge leads to another outline node, signaling that the graph polygon extraction of the particular graph polygon being processed is complete, the geometry generation engine 515 or 535 may store the another outline node in the node list in step 950.

Step 910 of the method 900 is to determine an outline node on an original shape outline, for example, the original shape outline 830 in FIG. 8. As explained above in reference to FIG. 7, the original shape outline 830 is initially received by the modeling application in step 710 of method 700.

In step 915, an outline node, such as one of outline nodes 820A-820E in FIG. 8, is stored in a node list associated with a graph polygon. The node list is associated with a graph polygon, such as the graph polygon 1160 in FIG. 13.

In step 920, an edge connected to the outline node is an edge forming a part of the straight skeleton graph. For example, in FIG. 8, if the outline node 820A is determined in step 910, an edge connected to the outline node 820A would be determined in step 920, such as the edge of the straight skeleton graph 840 that connects the outline node 820A and the internal node 825A.

Once the edge connected to the outline node is determined in step 920, that edge is traversed in order to determine an internal node. The internal node may be, for example, the internal node 825A in FIG. 8. An internal node (e.g., internal nodes 825A-825C) is a graph node, of a straight skeleton graph, that lies inside the original shape outline. On the other hand, an outline node (e.g., outline nodes 820A-820E) is a graph node, of a straight skeleton graph, that lies on the original shape outline.

Figure 10:
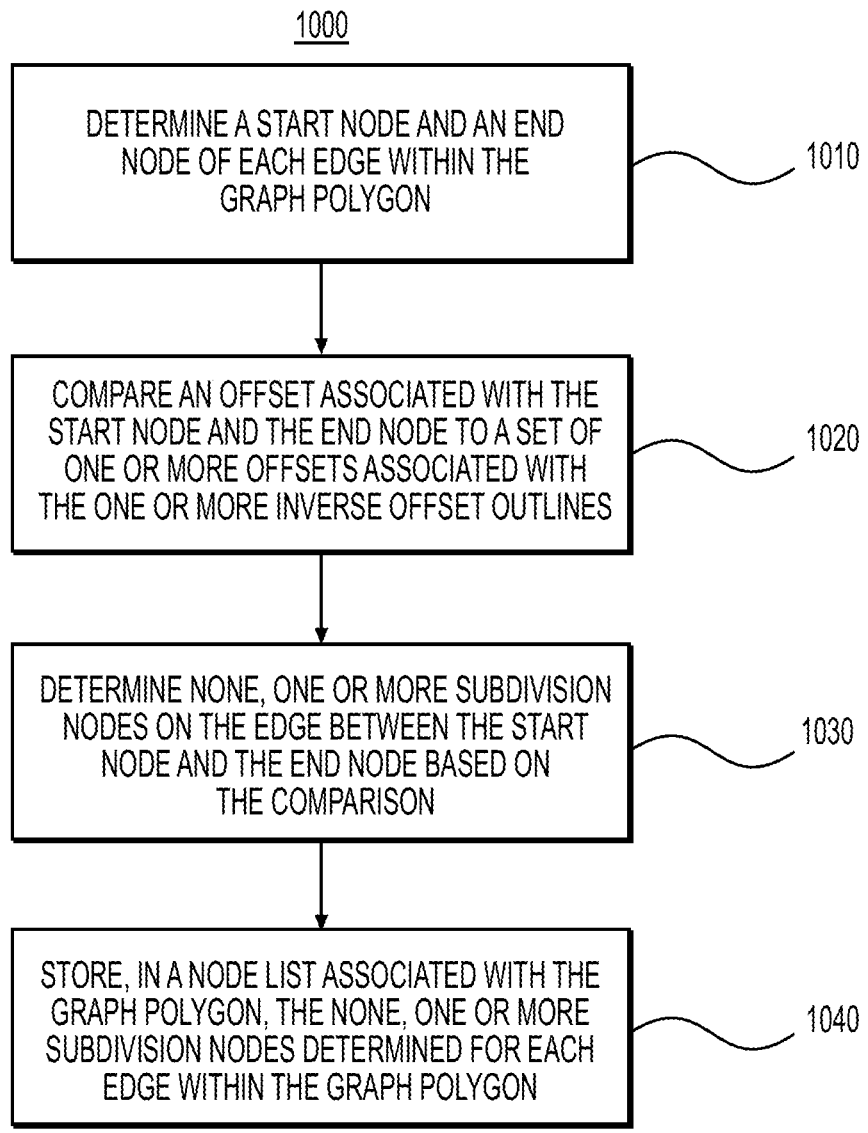
FIG. 10 shows a flowchart illustrating an exemplary method of subdividing edges in the extracted graph polygon, according to one aspect of the current disclosure.

FIG. 10 is a flowchart illustrating an exemplary method of subdividing edges in the extracted polygon, according to one aspect of the current disclosure. The method 1000 may be performed by the geometry generation engine 515 on the client device 510 or the geometry generation engine 535 on the server 530 shown in FIG. 5. At step 1010, the geometry generation engine 515 or 535 may determine a start node and an end node of each edge within a graph polygon. The graph polygon may be, for example, the graph polygon 1160 shown in FIG. 11. In step 1020, the geometry generation engine 515 or 535 may compare an offset associated with the start node and the end node to a set of one or more offsets associated with the one or more inverse offset outlines. For example, the one or more inverse offset outlines may be the inverse offset outlines 835A-835G in FIG. 11. In step 1030, the geometry generation engine 515 or 535 may determine none, one or more subdivision nodes on the edge between the start node and the end node based on the comparison performed in step 1020. In step 1040, the geometry generation engine 515 or 535 may store the none, one or more subdivision nodes determined for each edge within the graph polygon in a node list associated with the graph polygon.

Figure 11:
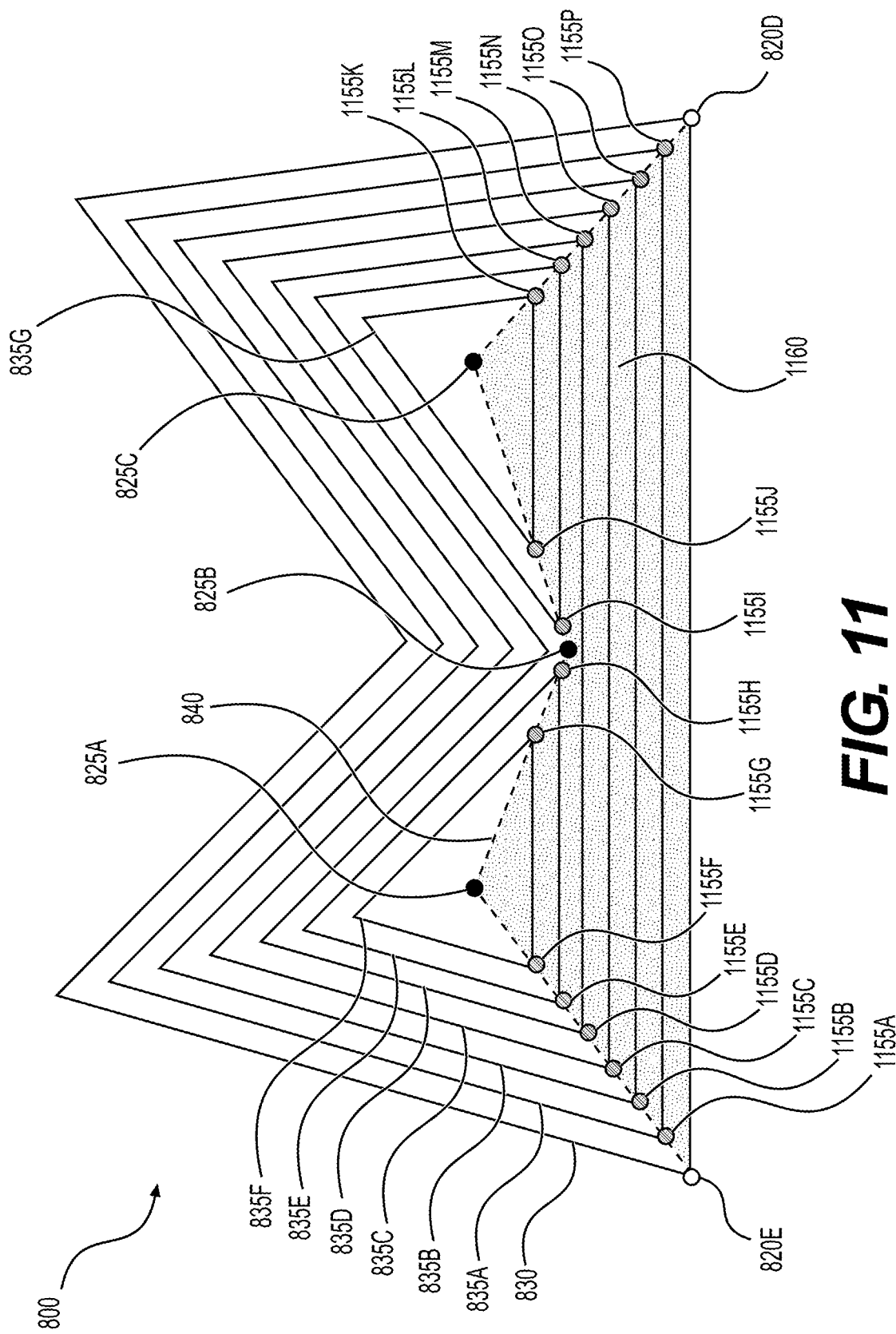
FIG. 11 shows a straight skeleton area with subdivision nodes and outline nodes of an extracted polygon.

FIG. 11 is the graph 800 from FIG. 8, additionally depicting an extracted graph polygon 1160. The extracted graph polygon 1160, the result of method 900 in FIG. 9, further comprises subdivision nodes 1155A-1155P. These subdivision nodes are the result of method 1000 in FIG. 10.

Figure 12:
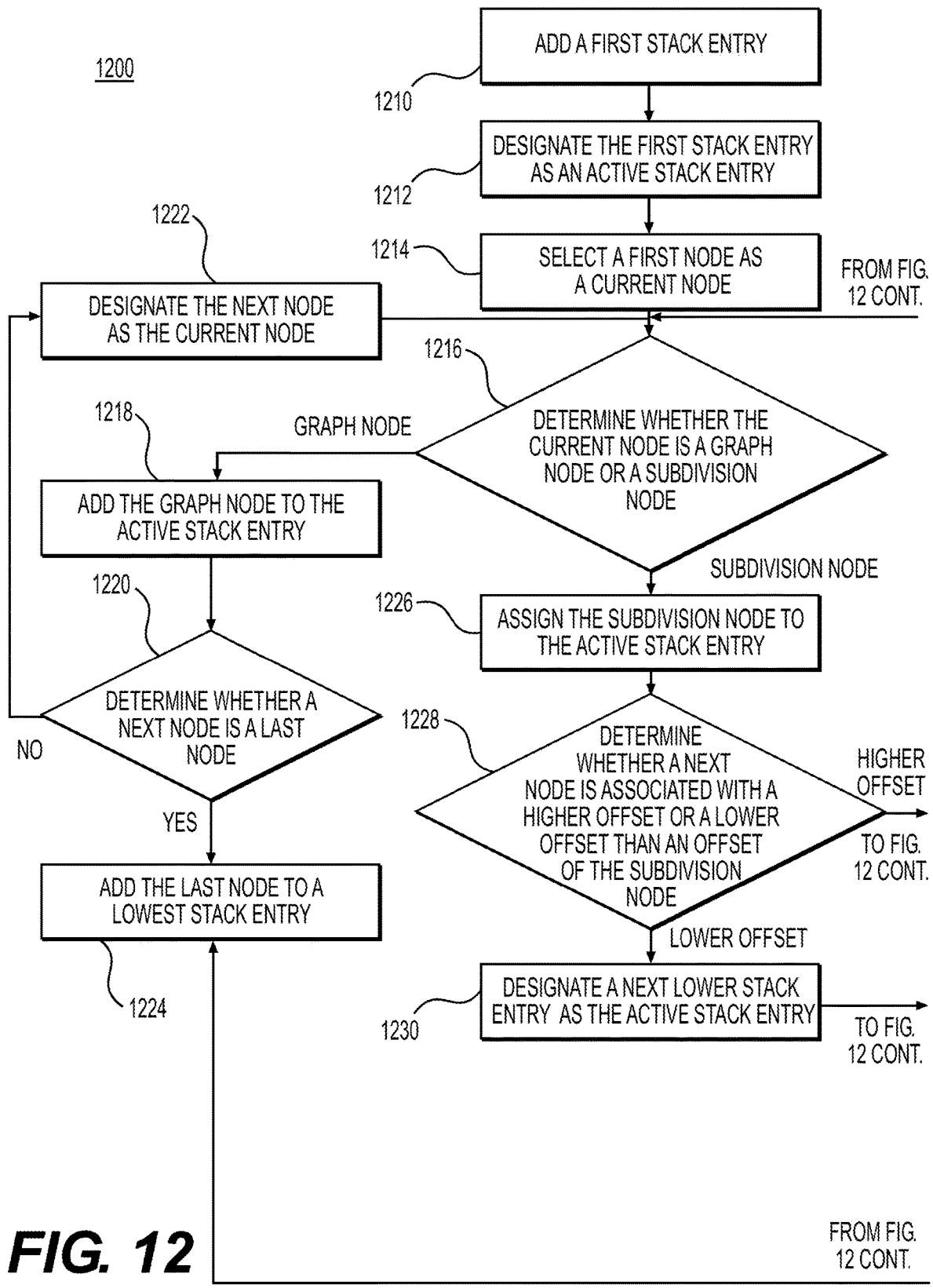
FIG. 12 shows a flowchart illustrating an exemplary method of storing nodes corresponding to extracted polygons, according to one aspect of the current disclosure.
Figure 12:
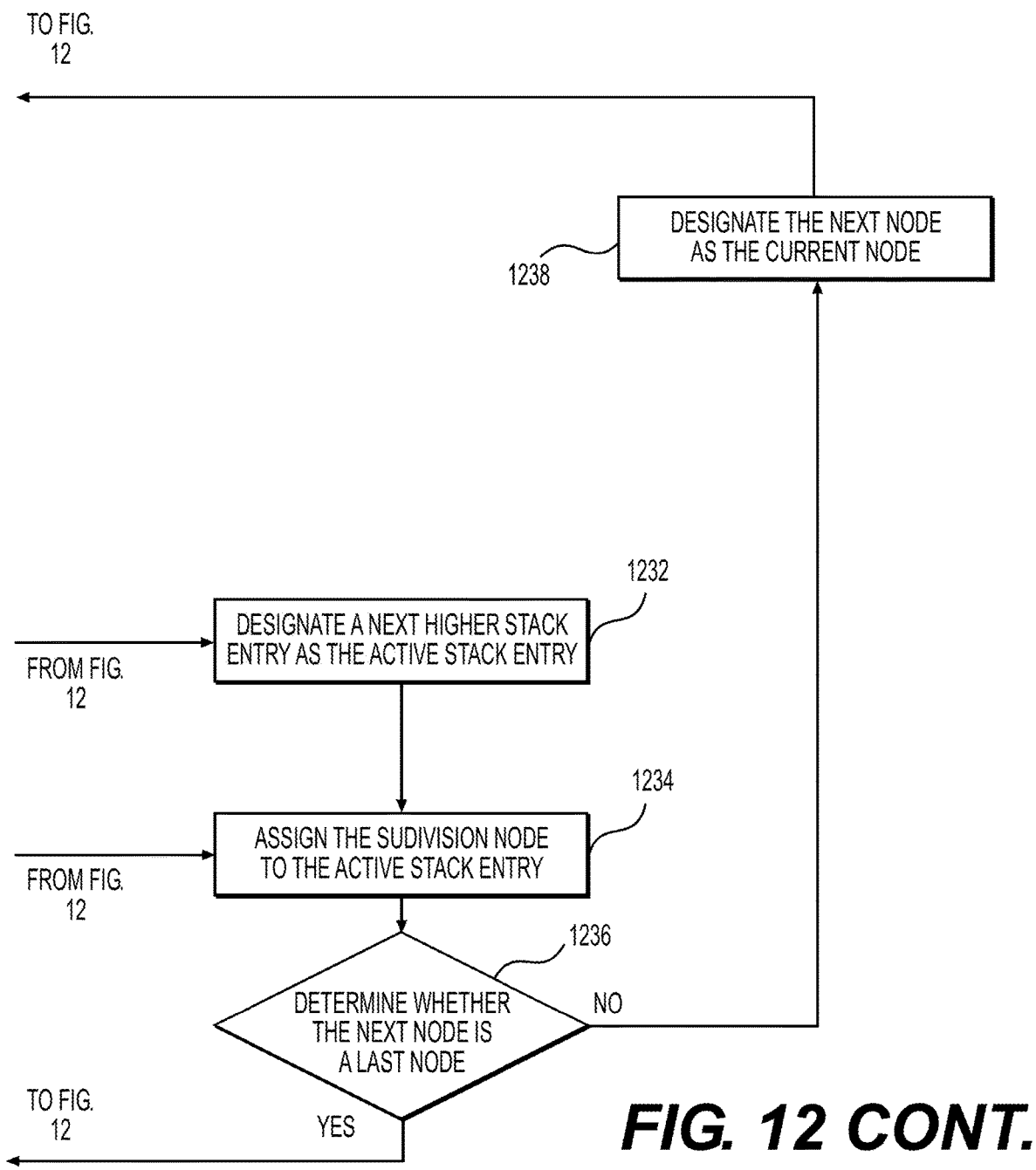

FIG. 12 is a flowchart illustrating an exemplary method of storing nodes corresponding to extracted polygons. The method 1200 may be performed by the geometry generation engine 515 on the client device 510 or the geometry generation engine 535 on the server 530 in FIG. 5. An efficient stack-based approach can be used to store nodes corresponding to extracted graph polygons. A stack comprises a list of references to the nodes of the graph polygon (i.e., the straight skeleton area) being processed. In step 1210, the geometry generation engine 515 or 535 may add a first stack entry. In step 1212, the geometry generation engine 515 or 535 may designate the first stack entry as an active stack entry. In step 1214, the geometry generation engine 515 or 535 may select a first node as a current node. In step 1216, the geometry generation engine 515 or 535 may determine whether the current node is a graph node or a subdivision node. If the current node is a graph node, the geometry generation engine 515 or 535 may add the graph node to the active stack entry in step 1218. Then in step 1220, the geometry generation engine 515 or 535 may determine whether a next node is a last node. If the next node is not a last node, the geometry generation engine 515 or 535 may designate the next node as the current node in step 1222, before returning to step 1216 to determine whether this current node is a graph node or subdivision node. However, if in step 1220 the geometry generation engine 515 or 535 determines that a next node is a last node, the geometry generation engine 515 or 535 may add the last node to a lowest stack entry in step 1224 to complete the process.

However, in step 1216, the geometry generation engine 515 or 535 may determine that the current node is a subdivision node. Should this be the case, in step 1226 the geometry generation engine 515 or 535 may assign (i.e., add) the subdivision node to the active stack entry. In step 1228, the geometry generation engine 515 or 535 may determine whether a next node is associated with a higher offset or a lower offset than an offset of the subdivision node.

If it is determined at step 1228 that the next node has a higher offset, in step 1232 the geometry generation engine 515 or 535 may go up to a next stack entry and designate that next stack entry as the active stack entry, or, if already at the topmost stack entry, add a new stack entry at the top of the stack and designate that stack entry as the active stack entry. In step 1234, the geometry generation engine 515 or 535 may assign (i.e., add) the subdivision node to the active stack entry.

If it is determined at step 1228 that the next node has a lower offset, the geometry generation engine 515 or 535 in step 1230 may go down to a next stack entry and designate that next stack entry as the active stack entry. Then in step 1234, the geometry generation engine 515 or 535 may assign (i.e., add) the subdivision node to the active stack entry. In step 1236, the geometry generation engine 515 or 535 may determine whether the next node (for which an offset has been determined to be higher or lower) is a last node. If the next node is not a last node, in step 1238 the geometry generation engine 515 or 535 may designate the next node as the current node, and the method 1200 loops back to step 1216 to process that newly-designated current node. However, if the next node is a last node, the geometry generation engine 515 or 535 may add that last node to a lowest stack in step 1224.

Upon performing the method 1200 for the graph polygons, every stack may contain a list of nodes that define an offset slice of the corresponding graph polygon. These lists may be split into sub-polygons (i.e., final polygons) by going through each stack's node list and splitting them between nodes that have the same offset.

The same method as shown in FIG. 12 may be used to obtain a closed and connected surface object. Here, an individual final point index is created for every node and every added subdivided point on first insertion. This way, adjacent straight skeleton areas are using the same indices for points with the same location.

Figure 13:
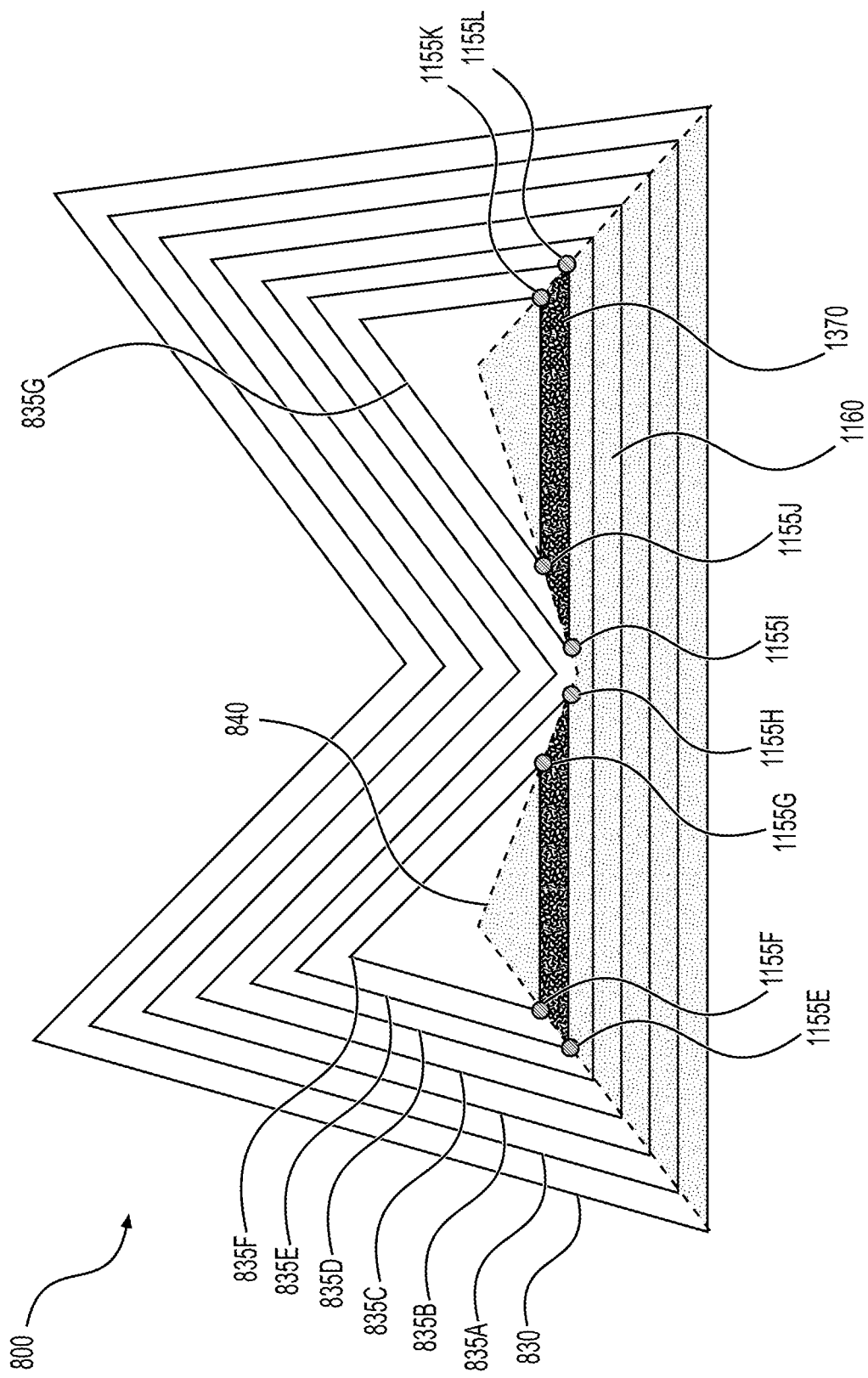
FIG. 13 shows sub-polygons of an inverted offset slice.

FIG. 13 is the graph 800 from FIG. 11, additionally depicting sub-polygons of a graph polygon, represented by a set of subdivision points identified using method 1000 depicted in FIG. 10. One example sub-polygon associated with graph polygon 1160 is sub-polygon 1370.

Figure 14:
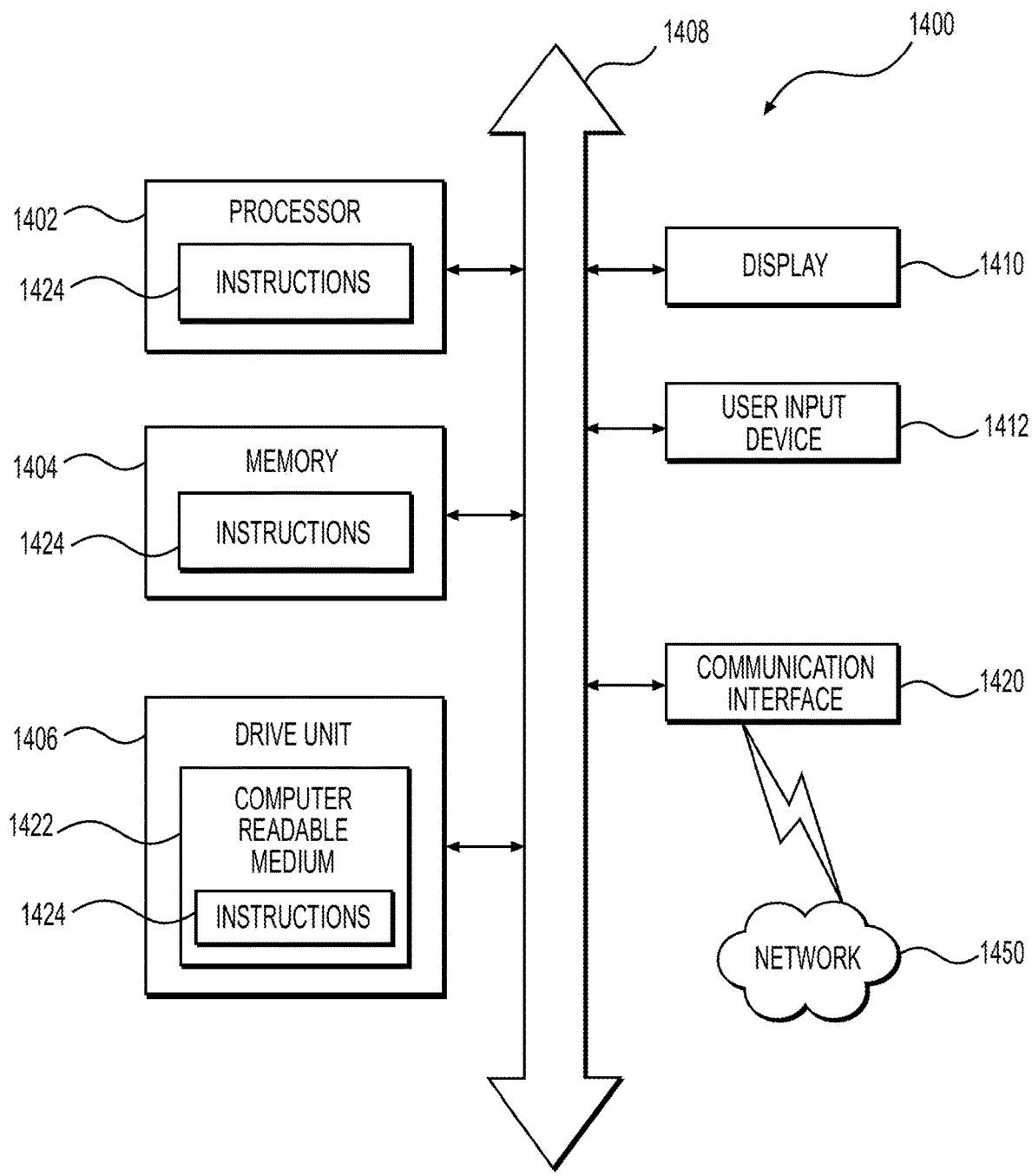
FIG. 14 illustrates an implementation of a computer system that may execute techniques presented herein.

FIG. 14 illustrates an implementation of a computer system designated 1400. The computer system 1400 can include a set of instructions that can be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1400 can be implemented using electronic devices that provide voice, video, or data communication. Further, while a single computer system 1400 is illustrated, the term "system" shall also be taken to include any collection of systems or sub-systems that individually or jointly execute a set, or multiple sets, of instructions to perform one or more computer functions.

As illustrated in FIG. 14, the computer system 1400 may include a processor 1402, e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1404 includes a cache or random-access memory for the processor 1402. In alternative implementations, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described herein may be performed by the programmed processor 1402 executing the instructions stored in the memory 1404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1400 may further include a display 1410, such as a liquid crystal display (LCD), an organic light emitting diode (OLED), a flat panel display, a solid-state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or in the drive unit 1406.

Additionally or alternatively, the computer system 1400 may include an input device 1412 configured to allow a user to interact with any of the components of system 1400. The input device 1412 may be a number pad, a keyboard, or a cursor control device, such as a mouse, or a joystick, touch screen display, remote control, or any other device operative to interact with the computer system 1400.

The computer system 1400 may also or alternatively include a disk or optical drive unit 1406. The disk drive unit 1406 may include a computer-readable medium 1422 in which one or more sets of instructions 1424, e.g. software, can be embedded. Further, the instructions 1424 may embody one or more of the methods or logic as described herein. The instructions 1424 may reside completely or partially within the memory 1404 and/or within the processor 1402 during execution by the computer system 1400. The memory 1404 and the processor 1402 also may include computer-readable media as discussed above.

In some systems, a computer-readable medium 1422 includes instructions 1424 or receives and executes instructions 1424 responsive to a propagated signal so that a device connected to a network 1450 can communicate voice, video, audio, images, or any other data over the network 1450. Further, the instructions 1424 may be transmitted or received over the network 1450 via a communication port or interface 1420, and/or using a bus 1408. The communication port or interface 1420 may be a part of the processor 1402 or may be a separate component. The communication port 1420 may be created in software or may be a physical connection in hardware. The communication port 1420 may be configured to connect with a network 1450, external media, the display 1410, or any other components in computer system 1400, or combinations thereof. The connection with the network 1450 may be a physical connection, such as a wired Ethernet connection or may be established wirelessly as discussed below. Likewise, the additional connections with other components of the computer system 1440 may be physical connections or may be established wirelessly. The network 1450 may alternatively be directly connected to the bus 1508.

While the computer-readable medium 1422 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1422 may be non-transitory, and may be tangible.

The computer-readable medium 1422 can include a solid-state memory such as a memory card or other package that houses one or more non-volatile read-only memories. The computer-readable medium 1422 can be a random-access memory or other volatile re-writable memory. Additionally or alternatively, the computer-readable medium 1422 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1400 may be connected to one or more networks 1450. The network 1450 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 1450 may include wide area networks (WAN), such as the Internet, local area networks (LAN), campus area networks, metropolitan area networks, a direct connection such as through a Universal Serial Bus (USB) port, or any other networks that may allow for data communication. The network 1450 may be configured to couple one computing device to another computing device to enable communication of data between the devices. The network 1450 may generally be enabled to employ any form of machine-readable media for communicating information from one device to another. The network 1450 may include communication methods by which information may travel between computing devices. The network 1450 may be divided into sub-networks. The sub-networks may allow access to all of the other components connected thereto or the sub-networks may restrict access between the components. The network 1450 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for polygonal mesh geometry extraction, the method comprising:
   receiving an original shape outline;
   determining a straight skeleton graph of the original shape outline, the straight skeleton graph comprising a plurality of edges;
   determining one or more inverse offset outlines of the original shape outline based on the straight skeleton graph;
   determining one or more polygons based on a union of the straight skeleton graph, the original shape outline, and the one or more inverse offset outlines, the one or more polygons including one or more graph polygons and one or more sub-polygons wherein determining one or more polygons comprises determining a plurality of graph nodes at the ends of each the plurality of edges, the plurality of graph nodes defining the one or more graph polygons and including one or more outline nodes and one or more internal nodes, and determining a plurality of subdivision nodes at the intersections of the plurality of edges and the one or more inverse offset outlines, the plurality of subdivision nodes and the plurality of graph nodes defining the one or more sub-polygons; and designating a first stack entry as an active stack entry, adding a node to the active stack entry, upon determining that the node is a subdivision node of the plurality of subdivision nodes determining whether a next node is associated with a higher offset or a lower offset than an offset of the node, and upon determining that the next node is associated with a lower offset, designating a second stack entry lower than the first stack entry as the active stack entry and assigning the subdivision node to the second stack entry, or upon determining that the next node is associated with a higher offset, designating a third stack entry higher than the first stack entry as the active stack entry and assigning the subdivision node to the third stack entry.

2. The method of claim 1, wherein determining a plurality of graph nodes comprises, for each of the one or more graph polygons:
   determining a first outline node on the original shape outline;
   determining an edge connected to the first outline node;
   traversing through the edge to determine an internal node;
   determining a next edge connected to the internal node;
   traversing through the next edge to determine a next internal node;
   repeating the traversal for every next internal node until a second outline node is reached; and
   storing, in a node list associated with the polygon, the first outline node, one or more internal nodes, and the second outline node.

3. The method of claim 2, wherein the next edge is in a counterclockwise order to a previous edge.

4. The method of claim 1, wherein determining a plurality of subdivision nodes comprises, for each of the one or more graph polygons:
   determining a start node and an end node of each edge within the graph polygon;
   comparing an offset associated with the start node and the end node to a set of one or more offsets associated with the one or more inverse offset outlines;
   determining one or more subdivision nodes on the edge between the start node and the end node based on the comparison; and
   storing, in a node list associated with the graph polygon, the one or more subdivision nodes determined for each edge within the graph polygon.

5. The method of claim 1, wherein the one or more polygons comprise one or more quadrangles, one or more triangles, and/or one or more polygons with more than four line segments.

6. A system for polygonal mesh geometry extraction, comprising:
   one or more processors;
   at least one non-transitory computer readable medium storing instructions which, when executed by the one or more processors, cause the one or more processors to:
   receive an original shape outline;
   determine a straight skeleton graph of the original shape outline, the straight skeleton graph comprising a plurality of edges;
   determine one or more inverse offset outlines of the original shape outline based on the straight skeleton graph;
   determine one or more polygons based on a union of the straight skeleton graph, the original shape outline, and the one or more inverse offset outlines, the one or more polygons including one or more graph polygons and one or more sub-polygons;
   determine a plurality of graph nodes at the ends of each the plurality of edges, the plurality of graph nodes defining the one or more graph polygons and including one or more outline nodes and one or more internal nodes and determine a plurality of subdivision nodes at the intersections of the plurality of edges and the one or more inverse offset outlines, the plurality of subdivision nodes and the plurality of graph nodes defining the one or more sub-polygons; and
   designate a first stack entry as an active stack entry, add a node to the active stack entry, upon determining that the node is a subdivision node of the plurality of subdivision nodes determine whether a next node is associated with a higher offset or a lower offset than an offset of the node, and upon determining that the next node is associated with a lower offset, designate a second stack entry lower than the first stack entry as the active stack entry and assign the subdivision node to the second stack entry, or upon determining that the next node is associated with a higher offset, designating a third stack entry higher than the first stack entry as the active stack entry and assigning the subdivision node to the third stack entry.

7. The system of claim 6, wherein determining a plurality of graph nodes comprises, for each of the one or more graph polygons:
   determining a first outline node on the original shape outline;
   determining an edge connected to the first outline node;
   traversing through the edge to determine an internal node;
   determining a next edge connected to the internal node;
   traversing through the next edge to determine a next internal node;
   repeating the traversal for every next internal node until a second outline node is reached; and
   storing, in a node list associated with the polygon, the first outline node, one or more internal nodes, and the second outline node.

8. The system of claim 7, wherein the next edge is in a counterclockwise order to a previous edge.

9. The system of claim 6, wherein determining a plurality of subdivision nodes comprises, for each of the one or more graph polygons:
   determining a start node and an end node of each edge within the graph polygon;
   comparing an offset associated with the start node and the end node to a set of one or more offsets associated with the one or more inverse offset outlines;
   determining one or more subdivision nodes on the edge between the start node and the end node based on the comparison; and
   storing, in a node list associated with the graph polygon, the one or more subdivision nodes determined for each edge within the graph polygon.

10. The system of claim 6, wherein the one or more polygons comprise one or more quadrangles, one or more triangles, and/or one or more polygons with more than four line segments.

11. At least one non-transitory computer readable medium for polygonal mesh geometry extraction, the at least one non-transitory computer readable medium storing instructions which, when executed by one or more processors, cause the one or more processors to:
   receive an original shape outline;
   determine a straight skeleton graph of the original shape outline, the straight skeleton graph comprising a plurality of edges;
   determine one or more inverse offset outlines of the original shape outline based on the straight skeleton graph;
   determine one or more polygons based on a union of the straight skeleton graph, the original shape outline, and the one or more inverse offset outlines, the one or more polygons including one or more graph polygons and one or more sub-polygons;
   determine a plurality of graph nodes at the ends of each the plurality of edges, the plurality of graph nodes defining the one or more graph polygons and including one or more outline nodes and one or more internal nodes and determine a plurality of subdivision nodes at the intersections of the plurality of edges and the one or more inverse offset outlines, the plurality of subdivision nodes and the plurality of graph nodes defining the one or more sub-polygons; and
   designate a first stack entry as an active stack entry, add a node to the active stack entry, upon determining that the node is a subdivision node of the plurality of subdivision nodes determine whether a next node is associated with a higher offset or a lower offset than an offset of the node, and upon determining that the next node is associated with a lower offset, designate a second stack entry lower than the first stack entry as the active stack entry and assign the subdivision node to the second stack entry, or upon determining that the next node is associated with a higher offset, designating a third stack entry higher than the first stack entry as the active stack entry and assigning the subdivision node to the third stack entry.

12. The at least one non-transitory computer readable medium of claim 11, wherein determining a plurality of graph nodes comprises, for each of the one or more graph polygons:
   determining a first outline node on the original shape outline;
   determining an edge connected to the first outline node;
   traversing through the edge to determine an internal node;
   determining a next edge connected to the internal node;
   traversing through the next edge to determine a next internal node;
   repeating the traversal for every next internal node until a second outline node is reached; and
   storing, in a node list associated with the polygon, the first outline node, one or more internal nodes, and the second outline node.

13. The at least one non-transitory computer readable medium of claim 12, wherein the next edge is in a counter-clockwise order to a previous edge.

14. The at least one non-transitory computer readable medium of claim 11, wherein determining a plurality of subdivision nodes comprises, for each of the one or more graph polygons:
   determining a start node and an end node of each edge within the graph polygon;
   comparing an offset associated with the start node and the end node to a set of one or more offsets associated with the one or more inverse offset outlines;
   determining one or more subdivision nodes on the edge between the start node and the end node based on the comparison; and
   storing, in a node list associated with the graph polygon, the one or more subdivision nodes determined for each edge within the graph polygon.

* * * * *